(12) United States Patent
Yasuma

(10) Patent No.: US 10,873,712 B2
(45) Date of Patent: Dec. 22, 2020

(54) SIGNAL PROCESSING DEVICE, IMAGING DEVICE, AND SIGNAL PROCESSING METHOD

(71) Applicant: SONY SEMICONDUCTOR SOLUTIONS CORPORATION, Kanagawa (JP)

(72) Inventor: Fumihito Yasuma, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 76 days.

(21) Appl. No.: 16/308,692

(22) PCT Filed: Apr. 19, 2017

(86) PCT No.: PCT/JP2017/015667
§ 371 (c)(1),
(2) Date: Dec. 10, 2018

(87) PCT Pub. No.: WO2018/003245
PCT Pub. Date: Jan. 4, 2018

(65) Prior Publication Data
US 2019/0149755 A1 May 16, 2019

(30) Foreign Application Priority Data
Jun. 27, 2016 (JP) .................................. 2016-126217

(51) Int. Cl.
*H04N 5/361* (2011.01)
*H04N 5/232* (2006.01)
(Continued)

(52) U.S. Cl.
CPC ............. *H04N 5/361* (2013.01); *H04N 5/232* (2013.01); *H04N 5/36963* (2018.08); *H04N 5/378* (2013.01); *H04N 5/379* (2018.08)

(58) Field of Classification Search
CPC .. H04N 5/23212; H04N 5/3696; H04N 5/335; H04N 5/2253; H04N 5/332;
(Continued)

(56) References Cited

U.S. PATENT DOCUMENTS 8,462,234 B2 * 6/2013 Kawamura ............ H04N 5/361 348/243
9,432,603 B2 * 8/2016 Ishii ...................... H04N 5/361
(Continued)

FOREIGN PATENT DOCUMENTS

JP 2003-333432 A 11/2003
JP 2008-131546 A 6/2008
(Continued)

OTHER PUBLICATIONS

International Search Report and Written Opinion of PCT Application No. PCT/JP2017/015667, dated Jul. 25, 2017, 11 pages of ISRWO.

*Primary Examiner* — Pritham D Prabhakher
(74) *Attorney, Agent, or Firm* — Chip Law Group

(57) ABSTRACT

A signal processing device including an adjusting unit that adjusts an offset amount on a basis of output values of effective pixels for which the output values are equal to or less than a threshold among a plurality of effective pixels included in at least part of a region of a light receiving surface. The signal processing device further includes a correcting unit that corrects the output values of the effective pixels on a basis of the adjusted offset amount.

17 Claims, 21 Drawing Sheets

(51) Int. Cl.
H04N 5/369 (2011.01)
H04N 5/378 (2011.01)

(58) Field of Classification Search
CPC .............. H04N 9/045; H01L 27/14645; H01L 27/14621; H01L 27/14627; H01L 27/14685; H01L 27/14687; H01L 27/1446; H01L 27/14603; H01L 27/14625; H01L 27/14632; H01L 27/14643; H01L 27/14689; H01L 31/0232; G03B 7/099; G02B 7/346; G02B 5/201; G02B 3/0043
USPC .......................................................... 348/245
See application file for complete search history.

(56) References Cited

U.S. PATENT DOCUMENTS

| | | | | |
|---|---|---|---|---|
| 9,721,609 | B2* | 8/2017 | Kobuse | G11B 20/00007 |
| 9,736,406 | B2* | 8/2017 | Kimura | H04N 5/378 |
| 9,948,879 | B2* | 4/2018 | Hirai | H04N 5/37457 |
| 2007/0013793 | A1* | 1/2007 | Konda | H04N 5/361 |
| | | | | 348/241 |
| 2010/0053383 | A1* | 3/2010 | Ichikawa | H04N 5/361 |
| | | | | 348/247 |
| 2010/0060768 | A1 | 3/2010 | Ukita et al. | |
| 2012/0199930 | A1* | 8/2012 | Hayashi | H01L 27/14636 |
| | | | | 257/435 |
| 2012/0314106 | A1* | 12/2012 | Kanemitsu | H04N 5/165 |
| | | | | 348/243 |
| 2013/0021497 | A1* | 1/2013 | Kawamura | H04N 5/361 |
| | | | | 348/231.3 |
| 2014/0354862 | A1* | 12/2014 | Inoue | H04N 5/3572 |
| | | | | 348/243 |
| 2015/0016722 | A1 | 1/2015 | Onda et al. | |
| 2015/0163424 | A1* | 6/2015 | Morino | H04N 5/361 |
| | | | | 348/243 |
| 2015/0304578 | A1* | 10/2015 | Okura | H04N 5/374 |
| | | | | 348/308 |
| 2016/0065873 | A1* | 3/2016 | Maeta | H04N 5/341 |
| | | | | 348/322 |
| 2016/0219229 | A1* | 7/2016 | Kimura | H04N 5/357 |
| 2016/0344962 | A1* | 11/2016 | Hirai | H04N 5/37457 |
| 2017/0061646 | A1* | 3/2017 | Shimada | G06T 5/50 |
| 2017/0084653 | A1 | 3/2017 | Nakata | |

FOREIGN PATENT DOCUMENTS

| | | |
|---|---|---|
| JP | 4279313 B2 | 6/2009 |
| JP | 2010-068056 A | 3/2010 |
| JP | 5686267 B2 | 3/2015 |
| JP | 2015-233043 A | 12/2015 |
| WO | 2006/137216 A1 | 12/2006 |
| WO | 2013/129225 A1 | 9/2013 |

* cited by examiner

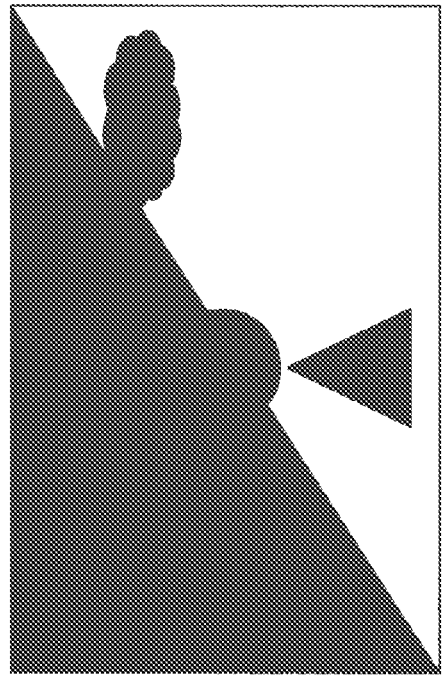
FIG. 7B BLACK PIXEL DETERMINATION RESULT
(DISPLAY POSITIONS OF BLACK PIXELS IN WHITE)
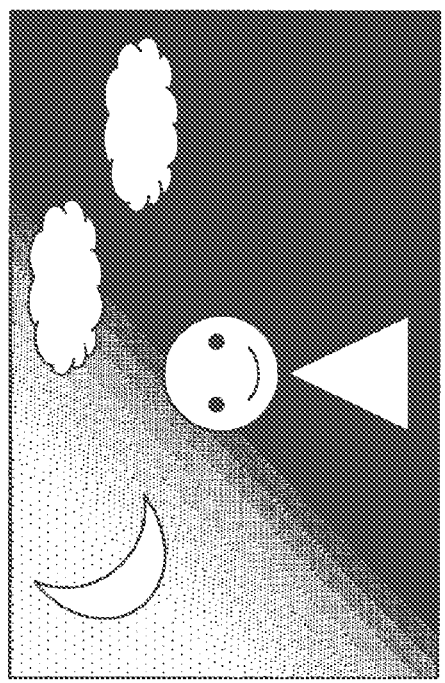
FIG. 7A INPUT IMAGE

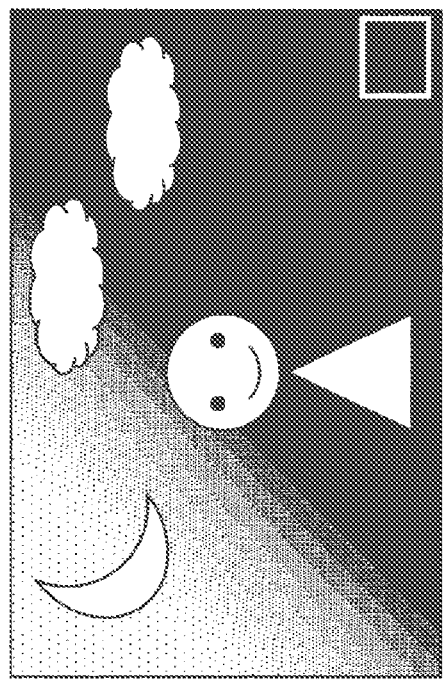
FIG. 9A MEASUREMENT AREA
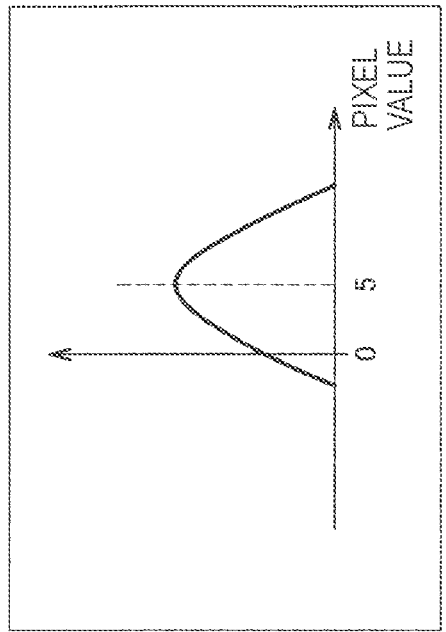
FIG. 9B HISTOGRAM BEFORE APPLICATION
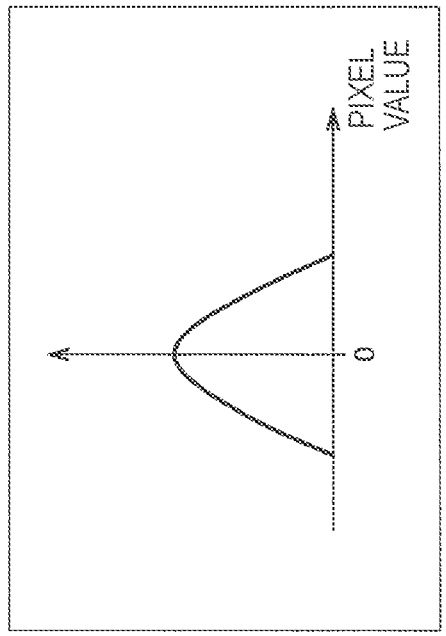
FIG. 9C HISTOGRAM AFTER APPLICATION FIG. 18
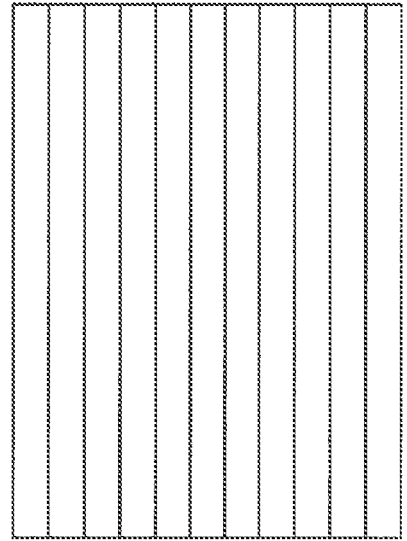
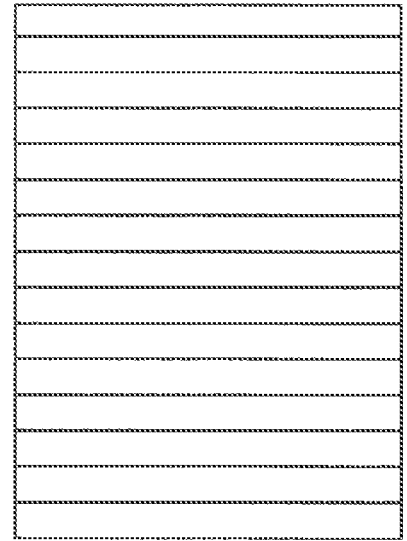
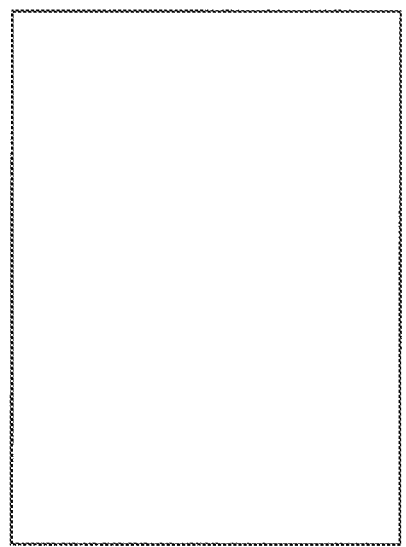
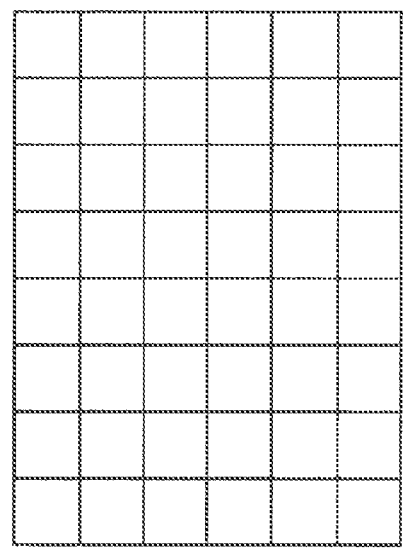

FIG. 20

SIGNAL PROCESSING DEVICE, IMAGING DEVICE, AND SIGNAL PROCESSING METHOD

CROSS REFERENCE TO RELATED APPLICATIONS

This application is a U.S. National Phase of International Patent Application No. PCT/JP2017/015667 filed on Apr. 19, 2017, which claims priority benefit of Japanese Patent Application No. JP 2016-126217 filed in the Japan Patent Office on Jun. 27, 2016. Each of the above-referenced applications is hereby incorporated herein by reference in its entirety.

TECHNICAL FIELD

The present disclosure relates to a signal processing device, an imaging device, and a signal processing method.

BACKGROUND ART

As one example of processing for correcting image signals obtained using an image sensor (imaging element) such as a charge coupled device (CCD) and a complementary metal-oxide semiconductor (CMOS), there is so-called clamp processing of correcting deviation of a black level in the image signals. For example, Patent Literature 1 discloses an example of clamp processing of detecting a black level on the basis of image signals read out from pixels provided in a so-called optical black (OPB) region in which light is blocked with a metal, or the like, and correcting image signals read out from pixels within an effective pixel region.

CITATION LIST

Patent Literature

Patent Literature 1: JP 5686267B

DISCLOSURE OF INVENTION

Technical Problem

Meanwhile, in recent years, it is desired to realize further higher sensitivity of an image sensor. As one example of a mechanism for realizing such higher sensitivity, there is a method in which the higher sensitivity is realized by digital gain being applied on image signals output from the image sensor in processing in a later stage. Meanwhile, in the case where digital gain is applied on the image signals, influence of noise tends to be larger. Therefore, if an error occurs in a detection result of a black level, even if the black level of the image signals is corrected through clamp processing, there is a case where the error in the detection result of the black level becomes apparent in the image as a phenomenon such as deviation of a black level (for example, excessive black and insufficient black) in association with application of the digital gain.

Therefore, the present disclosure proposes a signal processing device, an imaging device and a signal processing method which are capable of correcting deviation of a black level with more preferred aspects.

Solution to Problem

According to the present disclosure, there is provided a signal processing device including: an adjusting unit configured to adjust an offset amount on a basis of output values of effective pixels for which the output values are equal to or less than a threshold among a plurality of effective pixels included in at least part of a region of a light receiving surface; and a correcting unit configured to correct the output values of the effective pixels on a basis of the adjusted offset amount.

In addition, according to the present disclosure, there is provided an imaging device including: a light receiving surface including a plurality of effective pixels; an adjusting unit configured to adjust an offset amount on a basis of output values of effective pixels for which the output values are equal to or less than a threshold among the effective pixels included in at least part of a region of the light receiving surface; and a correcting unit configured to correct the output values of the effective pixels on a basis of the adjusted offset amount.

In addition, according to the present disclosure, there is provided a signal processing method including, by a processor: adjusting an offset amount on a basis of output values of effective pixels for which the output values are equal to or less than a threshold among a plurality of effective pixels included in at least part of a region of a light receiving surface; and correcting the output values of the effective pixels on a basis of the adjusted offset amount.

Advantageous Effects of Invention

As described above, according to the present disclosure, a signal processing device, an imaging device and a signal processing method which are capable of correcting deviation of a black level with more preferred aspects are provided.

Note that the effects described above are not necessarily limitative. With or in the place of the above effects, there may be achieved any one of the effects described in this specification or other effects that may be grasped from this specification.

BRIEF DESCRIPTION OF DRAWINGS

FIGS. 7A and 7B are explanatory diagrams for explaining outline of black pixel determination.

FIGS. 9A, 9B, and 9C are explanatory diagrams for explaining an example of clamp processing in the embodiment.

FIG. 18 is an explanatory diagram for explaining outline of the camera module according to modified example 3.

FIG. 20 is an explanatory diagram for explaining outline of the camera module according to modified example 3.

MODE(S) FOR CARRYING OUT THE INVENTION

Figure 1:
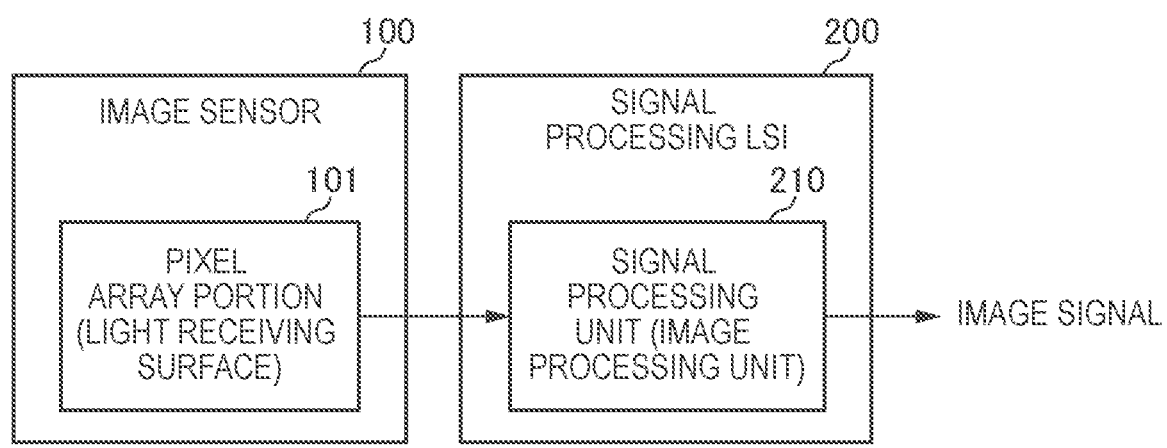
FIG. 1 is an explanatory diagram for explaining an example of a schematic configuration of a camera module according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. Outline
1.1. Schematic configuration
1.2. Examination regarding clamp processing
2. Functional configuration
2.1. Functional configuration of signal processing unit
2.2. Functional configuration of imaging device
2. Processing
4. Modified examples
4.1. Modified example 1: Configuration example of signal processing unit
4.2. Modified example 2: Configuration example of second clamp processing unit
4.3. Modified example 3: Configuration example of image sensor
4.4. Modified example 4: Control example of clamp processing
5. Hardware configuration
6. Application examples
6.1. Example of application to medical care
6.2. Example of application to mobile object
7. Conclusion

1. Outline

1.1. Schematic Configuration

First, an example of a schematic configuration of a camera module according to an embodiment of the present disclosure will be described with reference to FIG. 1 while attention is particularly focused on a configuration of a portion which outputs an imaging result as image signals. FIG. 1 is an explanatory diagram for explaining an example of the schematic configuration of the camera module according to an embodiment of the present disclosure.

In FIG. 1, a reference numeral 100 schematically indicates an image sensor provided at the camera module 1 according to the present embodiment. The image sensor 100 is, for example, an imaging element such as a complementary metal-oxide semiconductor (CMOS) image sensor and a charge coupled device (CCD) image sensor, which captures an image of a subject and obtains digital data of the captured image. The image sensor 100 includes a pixel array portion 101 in which a plurality of pixels are arranged in a matrix (array) form. Note that a region in which the pixel array portion 101 is provided corresponds to a light receiving surface of the image sensor 100. Further, while the image sensor 100 typically includes circuits other than the pixel array portion 101, in the example illustrated in FIG. 1, illustration of circuits other than the pixel array portion 101 is omitted to simplify explanation.

Further, a reference numeral 200 schematically indicates a signal processing large scale integration (LSI) which performs signal processing (image processing) on an image signal supplied on the basis of a pixel signal from each pixel of the pixel array portion 101. Examples of the signal processing can include, for example, black level correction, color mixture correction, defect correction, de-mosaic processing, matrix processing, gamma correction, YC conversion, or the like. The signal processing unit 210 schematically indicates an image processing function realized by the signal processing LSI 200. Note that, while the signal processing LSI 200 may include components for executing other functions other than image processing, in the example illustrated in FIG. 1, illustration of components other than the signal processing unit 210 is omitted to simplify explanation.

That is, as illustrated in FIG. 1, at the camera module 1 according to the present embodiment, the image sensor 100 generates image signals indicating a captured image of a subject by performing photoelectric conversion on light incident via an optical system element which is not illustrated and performing A/D conversion on a pixel value of each pixel. Then, the image sensor 100 outputs the generated image signals as a stream to the signal processing unit 210 of the signal processing LSI 200.

The signal processing LSI 200 acquires the image signals output as a stream from the image sensor 100, performs signal processing on the acquired image signals and causes the image signals after signal processing to be displayed as an image (such as, for example, a through image), for example, at a display unit which is not illustrated. By this means, the user can confirm the captured image via the display unit. Further, the signal processing LSI 200 may store the image signals after signal processing, for example, in a storage unit which is not illustrated as image data.

An example of the schematic configuration of the camera module according to an embodiment of the present disclosure has been described above with reference to FIG. 1 while attention is particularly focused on the configuration of the portion which outputs an imaging result as image signals.

1.2. Examination Regarding Clamp Processing

Subsequently, after outline of processing for correcting a black level, which is so-called clamp processing is described, a problem of the camera module according to an embodiment of the present disclosure will be organized.

Typically, at the image sensor, electrons inside a silicon which is excited by light energy by light being radiated on photodiodes built on a silicon substrate are read out as image signals. From such characteristics, it is desirable that, in a state where light is not input to the photodiodes, a signal level of the image signals read out from the photodiodes is 0. Note that a signal level of the image signals read out from the photodiodes in a state where light is not input to the photodiodes corresponds to a "black level".

However, even in the case where light incident on the photodiodes is completely blocked, there is a case where signals read out from the photodiodes do not become 0. As a specific example, there is a case where signals read out from the photodiodes do not become 0 by influence of a dark current and readout noise. Because the dark current and the readout noise change from moment to moment in accordance with, for example, a temperature and a state of a power supply, it is difficult to measure the dark current and the readout noise in advance.

In view of such circumstances, there is a case where, at the image sensor, a region which is called an optical black (OPB) region in which light is blocked by a metal, or the like, is provided in the vicinity of an open region (hereinafter, also referred to as an "effective pixel region").

Figure 2:
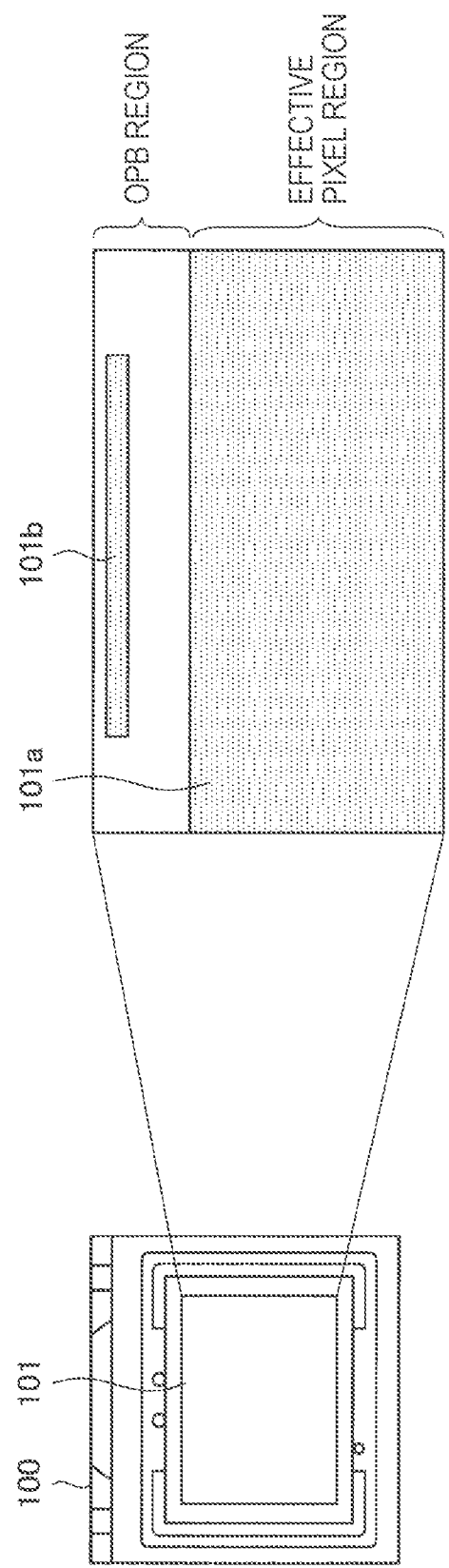
FIG. 2 is an explanatory diagram for explaining an example of a schematic configuration of an image sensor.

For example, FIG. 2 is an explanatory diagram for explaining an example of a schematic configuration of the image sensor. For example, in the example illustrated in FIG. 2, as illustrated in a drawing on the right side, in a pixel array portion 101 of the image sensor 100, the effective pixel region and the OPB region are provided. Note that, in the drawing on the right side in FIG. 2, a hatched portion indicates a portion where photodiodes (that is, pixels) are provided. For example, a reference numeral 101*a* schematically indicates photodiodes (that is, pixels) provided in the effective pixel region. Further, a reference numeral 101*b* schematically indicates photodiodes provided in the OPB region. Note that image signals based on pixel signals respectively read out from the photodiodes provided in the effective pixel region are output as an imaging result of an image.

By the OPB region being provided as described above, for example, by a level of the pixel signals output from the photodiodes provided in the OPB region being measured, it becomes possible to recognize of a level (offset amount) of signals including influence of a dark current and readout noise in a state where light is not incident. That is, by a measurement value of a level (that is, an offset amount) of the image signals output from the photodiodes within in the OBP region being subtracted from the image signals read out from the photodiodes within the effective pixel region, it becomes possible to ideally correct the black level to 0. Processing for correcting the black level of the image signals to 0 in this manner is also referred to as clamp processing.

Here, as a comparative example, outline of an example of the clamp processing will be described. In the clamp processing according to the comparative example, before image signals are read out from the photodiodes within the effective pixel region, signals are read out from the photodiodes within the OPB region, and the black level is detected on the basis of an average value of the signals read out from the photodiodes within the OPB region. Thereafter, the image signals are read out from the photodiodes within the effective pixel regions, and clamp processing is performed on the image signals so that a detection result of the black level is reflected. In this event, for example, an offset amount calculated on the basis of the signals read out from the photodiodes within the OPB region at the same frame timing as that of the image signals may be applied to the image signals read out from the photodiodes within the effective pixel region. By such control, also in the case where the offset amount precipitously changes such as upon change of analog gain, it becomes possible to perform clamp processing without delay of a frame.

Meanwhile, a size of the OPB region tends to be limited due to limitation of a size (that is, a chip size) of the image sensor, and only several lines at most are provided. That is, the number of photodiodes within the OPB region is limited, and, even if an average of the offset amounts (in other words, detection results of the black level) among the photodiodes within the OPB region is obtained, it is difficult to completely remove influence of noise, and, as a result, there is a case where a calculation result of the offset amount varies for each frame.

Figure 3:
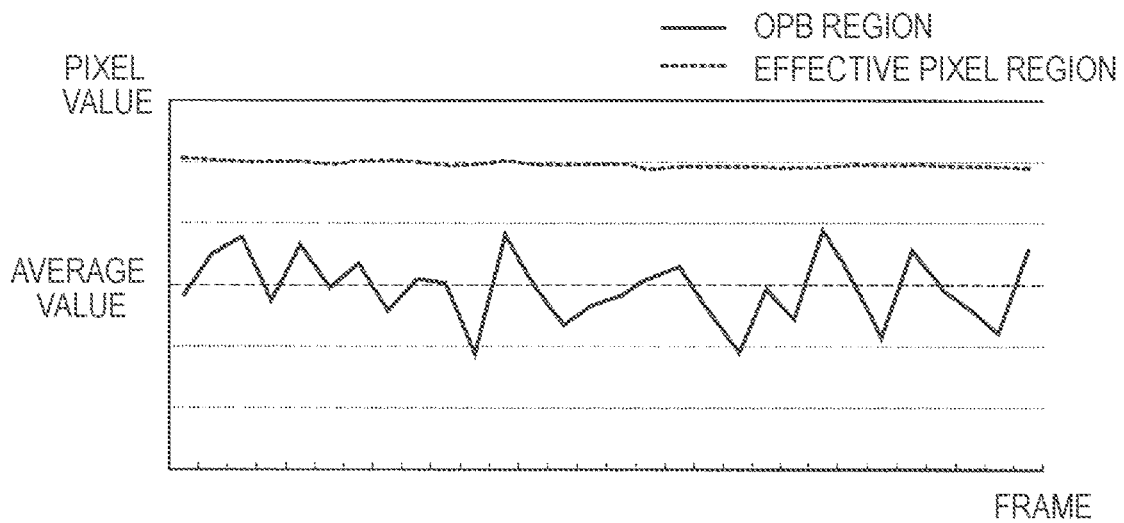
FIG. 3 is an explanatory diagram for explaining outline of an imaging element according to the embodiment.

For example, FIG. 3 is an explanatory diagram for explaining an example of the detection result of the black level, and schematically illustrates change of the image signals read out from the photodiodes within the OPB region for each frame. FIG. 3 indicates the number of frames on a horizontal axis and indicates a level of an image signal read out from the photodiode (hereinafter, also referred to as a "pixel value") on a vertical axis. Note that, in the example illustrated in FIG. 3, a graph indicating change of the average value of the detection results of the black level by the photodiodes within the OPB region, among the photodiodes within the OPB region is illustrated as data corresponding to the OPB region. Further, in the example illustrated in FIG. 3, a graph indicating change of an average value of the detection results of the black level by the photodiodes within the effective pixel region (that is, pixel values in the case where light is not incident on the photodiodes) among the photodiodes within the effective pixel region is illustrated as data corresponding to the effective pixels as reference.

As illustrated in FIG. 3, because a range of the effective pixel region is relatively large, and the number of photodiodes within the effective pixel region is relatively large, influence of noise is removed from the data corresponding to the effective pixel region, and the data corresponding to the effective pixel region little varies among frames. In contrast to this, because a range of the OPB region is smaller than that of the effective pixel region, and the number of photodiodes within the OPB region is relatively small, influence of noise cannot be completely removed from the data corresponding to the OPB region, which results in occurrence of variation among frames. If clamp processing is performed under circumstances where there occurs variation in detection results of the black level among frames in this manner, for example, the variation can become a cause of blink and flicker in an image.

To address this, by a dead band being provided with respect to detection of change (variation) of the black level and change of the black level which does not exceed a threshold being ignored, there is a case where an offset amount to be applied in the clamp processing can be made stable among the frames, and influence which can occur due to variation of the black level can be alleviated. However, because change of the offset amount (that is, change of the black level) which does not exceed the threshold is ignored by a dead zone being provided, there is a case where an error occurs between the detection result of the black level and the actual black level.

Further, timings at which image signals are read out from the photodiodes within the OPB region are strictly different from timings at which image signals are read out from the photodiodes within the effective pixel region. Therefore, for example, a case is assumed where change of circumstances such as change of a power supply voltage and change of power supply noise from a logic circuit occurs between these different timings. In such a case, the offset amount based on the image signals from the photodiodes within the OPB region does not necessarily match the offset amount for correcting the black level at the timings at which the image signals are read out from the photodiodes within the effective pixel region.

In related art, because deviation of the above-described offset amount is less than 1 least significant bit (LSB), and there is no possibility that influence of the deviation of the offset amount becomes apparent on an image, the deviation can be ignored. However, in recent years, there is a case where high digital gain is applied in image processing (signal processing) to be performed in the later stage of the image sensor to image a dark scene to be brighter. In such a case, there is a case where deviation of the above-described offset amount becomes equal to or greater than 1 LSB by being doubled as a result of the digital gain being applied, and, as a result, the deviation becomes apparent as a phenomenon such as excessive black (deviation of the black level) on the image.

In view of the circumstances as described above, a mechanism which is capable of correcting deviation of a black level with more preferred aspects in the camera module according to an embodiment of the present disclosure will be proposed. In the following description, the camera module according to an embodiment of the present disclosure and an imaging device to which the camera module is applied will be described in more details.

2. Functional Configuration

An example of a functional configuration of the camera module according to an embodiment of the present disclosure will be described.

2.1. Functional Configuration of Signal Processing Unit

A configuration of the signal processing unit 210 in the camera module 1 according to an embodiment of the present disclosure described with reference to FIG. 1 will be described first while attention is particularly focused on a portion which performs clamp processing on the image signals.

Figure 4:
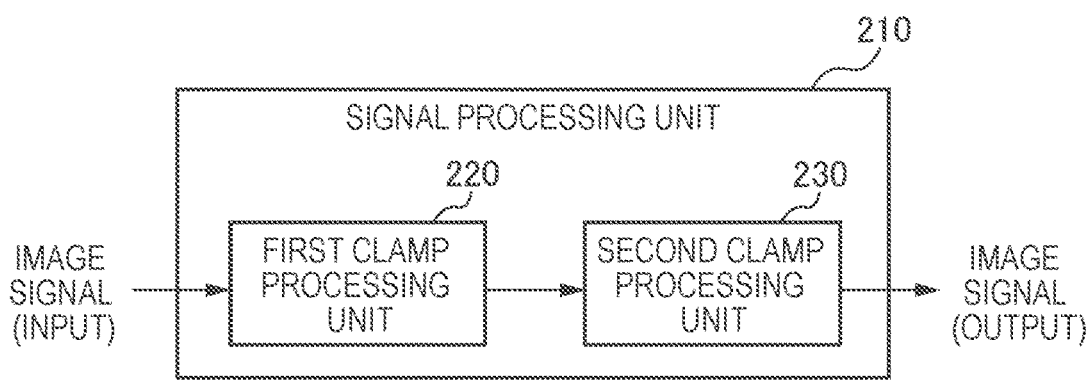
FIG. 4 is a block diagram illustrating an example of a functional configuration of a signal processing unit according to the embodiment.

For example, FIG. 4 is a block diagram illustrating an example of the functional configuration of the signal processing unit according to the present embodiment. As illustrated in FIG. 4, the signal processing unit 210 includes a first clamp processing unit 220 and a second clamp processing unit 230.

The first clamp processing unit 220 detects a black level on the basis of the image signals read out from the pixels (photodiodes) within the OPB region and corrects (that is, executes clamp processing) a signal level of the image signals read out from the pixels within the effective pixel region (hereinafter, also referred to as "effective pixels") on the basis of the detection result of the black level. Note that because content of the clamp processing (that is, processing content of the first clamp processing unit 220) to be executed in accordance with the detection result of the black level based on the image signals read out from the pixels within the OPB region has been already described above, detailed description will be omitted. The first clamp processing unit 220 then performs clamp processing on the image signals read out from the effective pixels and outputs the image signals subjected to the clamp processing to the second clamp processing unit 230.

The second clamp processing unit 230 detects a black level on the basis of the image signals read out from the effective pixels and corrects (that is, executes clamp processing) a signal level of the image signals on the basis of the detection result of the black level. The second clamp processing unit 230 corrects the signal level of the image signals by, for example, performing clamp processing again on the image signals output from the first clamp processing unit 220.

Figure 5:
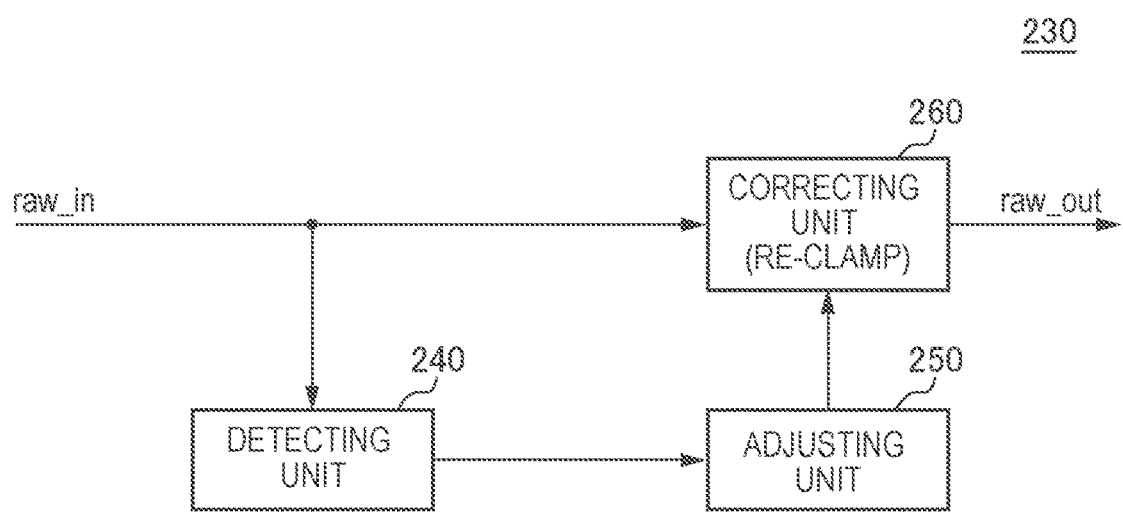
FIG. 5 is a block diagram illustrating an example of a functional configuration of a second clamp processing unit according to the embodiment.

For example, FIG. 5 is a block diagram illustrating an example of a functional configuration of the second clamp processing unit 230 according to the present embodiment. As illustrated in FIG. 5, the second clamp processing unit 230 includes a detecting unit 240, an adjusting unit 250 and a correcting unit 260. In FIG. 5, raw_in indicates an image signal (hereinafter, also referred to as an "input signal") input to the second clamp processing unit 230. Further, raw_out indicates an image signal (hereinafter, also referred to as an "output signal") output from the second clamp processing unit 230.

The detecting unit 240 detects a black level for each of a predetermined unit (for example, for each frame) on the basis of input signals which are sequentially input (that is, image signals read out from the effective pixels). Further, the adjusting unit 250 calculates an offset amount for performing clamp processing on the input signals on the basis of the detection result of the black level by the detecting unit 240. The correcting unit 260 then performs clamp processing on the input signals which are sequentially input for each of the predetermined unit on the basis of the offset amount calculated by the adjusting unit 250 and outputs the image signals subjected to the clamp processing to the later stage as output signals.

Figure 6:
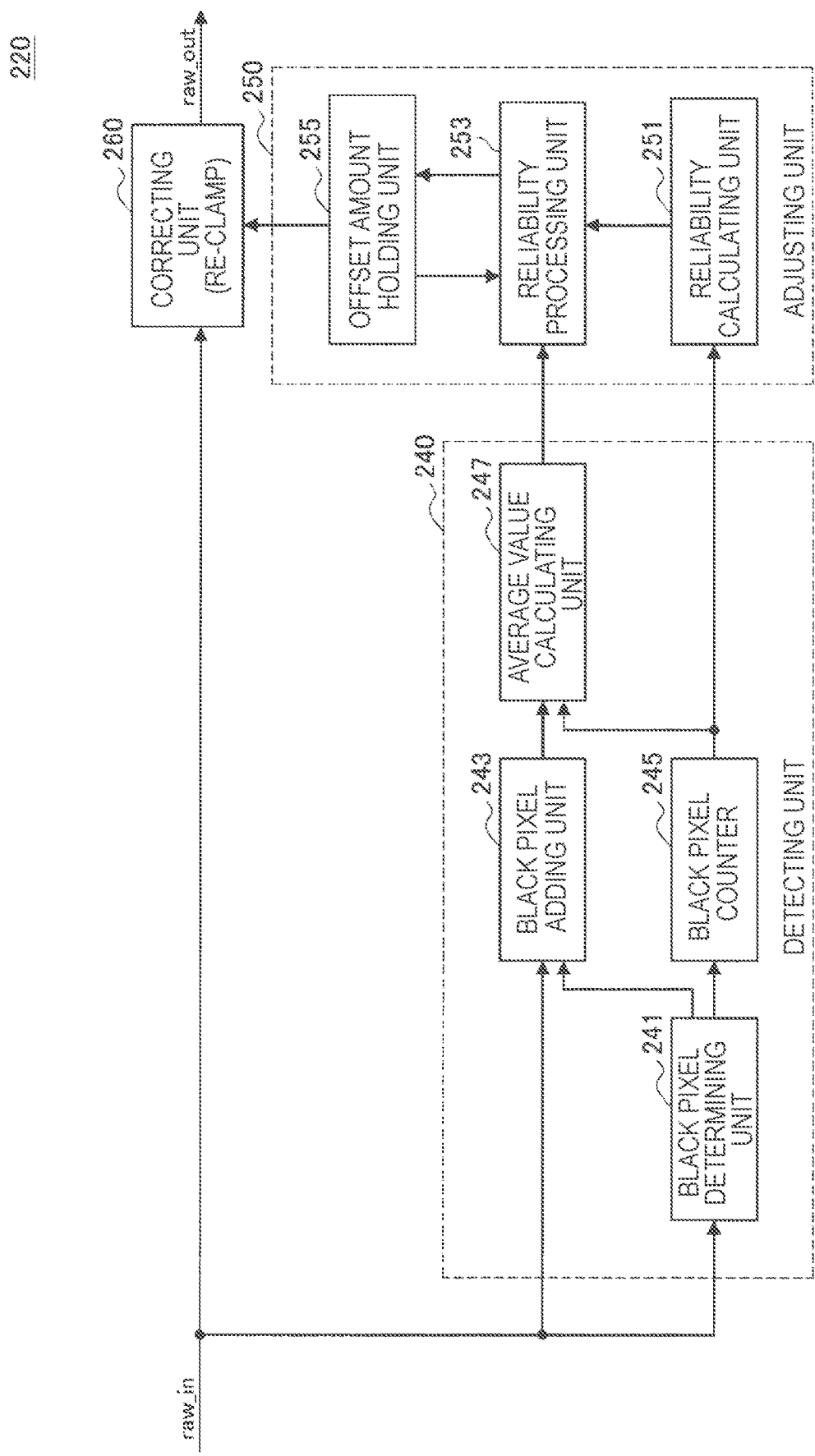
FIG. 6 is a block diagram illustrating an example of a detailed configuration of the second clamp processing unit according to the embodiment.

Here, an example of more detailed configurations of the detecting unit 240 and the adjusting unit 250 will be described with reference to FIG. 6. FIG. 6 is a block diagram illustrating an example of a detailed configuration of the second clamp processing unit 230 according to the present embodiment.

First, the configuration of the detecting unit 240 will be described. As illustrated in FIG. 6, the detecting unit 240 includes a black pixel determining unit 241, a black pixel adding unit 243, a black pixel counter 245 and an average value calculating unit 247.

The black pixel determining unit 241 determines whether or not the output values (that is, pixel values) from the effective pixels indicated by the input signals are values indicating so-called black. Specifically, the black pixel determining unit 241 determines whether or not absolute values of the input signals are equal to or less than a threshold blackpix_det_th on the basis of a relational expression indicated below as (equation 1). Note that, in the following description, an effective pixel whose output value indicates a value of black will be also referred to as a "black pixel", and processing of determining whether or not the effective pixel is a black pixel on the basis of the relational expression indicated below as (equation 1) will be also referred to as "black pixel determination".

(equation 1)

$$\text{flag} = \begin{cases} 1 & |\text{raw\_in}| < \text{blackpix\_det\_th} \\ 0 & \text{otherwise} \end{cases} \quad [\text{Math. 1}]$$

For example, FIGS. 7A and 7B are explanatory diagrams for explaining outline of black pixel determination. FIG. 7A schematically illustrates an input image. Further, a drawing on a right side illustrates a result of back pixel determination. In FIG. 7B, a portion of the black pixels among the input image illustrated on the left side (that is, a portion of pixels for which determination results based on the above-described (equation 1) indicate 1) is indicated in white.

Note that, it is only necessary to determine the threshold blackpix_det_th for black pixel determination, for example, on the basis of standard deviation σ of noise (so-called random noise) which occurs regardless of intensity of incident light.

Then, the black pixel determining unit 241 outputs results of the black pixel determination with respect to the input signals to the black pixel adding unit 243 and the black pixel counter 245.

The black pixel adding unit 243 acquires the results of the black pixel determination with respect to the input signals which are sequentially input, from the black pixel determining unit 241 and, in the case where pixel values from the effective pixels indicated by the input signals indicate black (that is, in the case where determination results based on (equation 1) are 1), performs cumulative addition of the pixel values on the basis of the results of the black pixel determination. As described above, the black pixel adding unit 243 performs cumulative addition of the pixel values of the effective pixels which are black pixels among the pixel values of the effective pixels indicated by the input signals which are sequentially input for each of a predetermined unit (for example, for each frame) and outputs an addition result to the average The black pixel counter 245 acquires the results of the black pixel determination with respect to the input signals which are sequentially input, from the black pixel determining unit 241 and counts the number of the effective pixels which are black pixels (that is, effective pixels for which determination results based on (equation 1) indicate 1) for each of a predetermined unit (for example, for each frame) on the basis of the results of the black pixel determination. Then, the black pixel counter 245 outputs a count result of the black pixels to the average value calculating unit 247, and the adjusting unit 250 located in the later stage of the detecting unit 240.

The average value calculating unit 247 acquires the addition result of the pixel values of the effective pixels which are black pixels from the black pixel adding unit 243. Further, the average value calculating unit 247 acquires the count result of the black pixels from the black pixel counter 245. Then, the average value calculating unit 247 calculates an average value of the pixel values of the effective pixels which are black pixels on the basis of the addition result of the pixel values of the effective pixels which are black pixels and the count result of the black pixels and outputs the calculated average value to the adjusting unit 250 as information indicating a detection result of the black level.

A configuration of the adjusting unit 250 will be described next. As illustrated in FIG. 6, the adjusting unit 250 includes a reliability calculating unit 251, a reliability processing unit 253 and an offset amount holding unit 255.

The reliability calculating unit 251 acquires the count result of the black pixels from the detecting unit 240 for each of the predetermined unit and calculates reliability regarding the detection result of the black level on the basis of the acquired count result of the black pixels. Note that it is assumed that the reliability indicates a value between 0.0 and 1.0.

Figure 8:
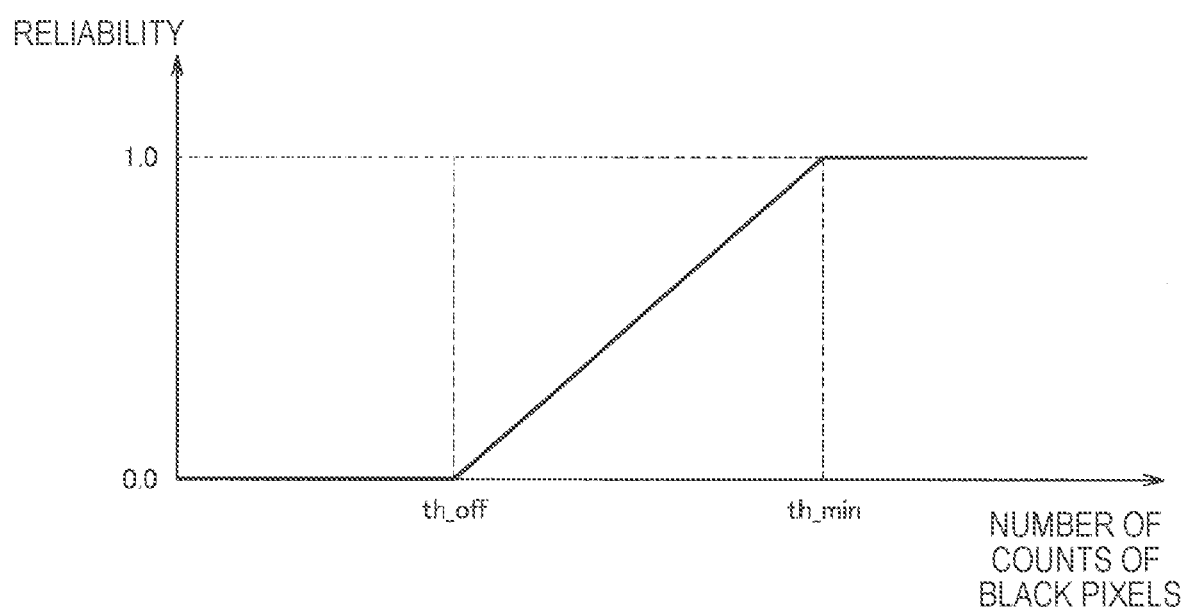
FIG. 8 is an explanatory diagram for explaining an example of a method for calculating reliability regarding a detection result of a black level.

For example, FIG. 8 is an explanatory diagram for explaining an example of a method for calculating reliability regarding the detection result of the black level. FIG. 8 indicates the number of counts (that is, a count result) of the black pixels on a horizontal axis. Further, FIG. 8 indicates reliability regarding the detection result of the black level on the vertical axis. That is, in the example illustrated in FIG. 8, the reliability calculating unit 251 sets the reliability at 0.0 in the case where the number of counts of the black pixels is equal to or less than a threshold th_off. Further, the reliability calculating unit 251 sets the reliability at 1.0 in the case where the number of counts of the black pixels is equal to or greater than a threshold th_min. Note that it is assumed that the threshold th_off and the threshold th_min have relationship of th_off<th_min. Further, the reliability calculating unit 251 may determine the reliability in accordance with the number of counts in the case where the number of counts of the black pixels falls within a value between the threshold th_off and the threshold th_min. For example, in the example illustrated in FIG. 8, characteristics (graph) of reliability calculation are interpolated so that the threshold th_off is linearly connected to the threshold th_min. That is, the reliability calculating unit 251 determines the reliability on the basis of the interpolated characteristics.

As described above, the reliability calculating unit 251 calculates the reliability regarding the detection result of the black level and outputs information indicating the calculated reliability to the reliability processing unit 253.

The reliability processing unit 253 acquires the information indicating the detection result of the black level (that is, the average value of the pixel values of the black pixels) from the detecting unit 240. Further, the reliability processing unit 253 acquires the information indicating the reliability of the detection result of the black level from the reliability calculating unit 251. The reliability processing unit 253 then calculates an offset amount for performing clamp processing on the input signals on the basis of the information indicating the detection result of the black level and the information indicating the reliability of the detection result.

As a specific example, the reliability processing unit 253 calculates an offset amount visible_black_value' for performing clamp processing on the input signals on the basis of a calculation formula indicated as (equation 2) below.

[Math. 2]

$$\text{visible\_black\_value}' = \text{ave} \times \text{gain} + \text{visible\_black\_value} \times (1.0 - \text{gain}) \quad \text{(equation 2)}$$

In the above-described (equation 2), ave indicates the detection result of the black level (that is, the average value of the pixel values of the black pixels). Further, gain indicates reliability of the detection result of the black level ave. Still further, visible_black_value indicated on the right side of (equation 2) indicates an offset amount calculated in the previous frame (for example, one frame before the frame). That is, in the above-described (equation 2), the offset amount visible_black_value' to be applied in clamp processing in the subsequent frames is calculated by the offset amount visible_black_value in the previous frame being taken into account in accordance with the value of the reliability gain.

Specifically, in the case where the reliability is 0.0, the offset amount calculated in the previous frame is applied as the offset amount in the subsequent frames. Here, a case where the reliability is 0.0 corresponds to a case where the number of counts of the black pixels is equal to or less than the threshold th_off in the example illustrated in FIG. 8.

Further, in the case where the reliability is 1.0, the acquired detection result of the black level (in other words, the offset amount in the current frame) is applied as the offset amount in the subsequent frames. Here, a case where the reliability is 1.0 corresponds to a case where the number of counts of the black pixels is equal to or greater than the threshold th_min in the example illustrated in FIG. 8.

Further, in the case where the reliability is higher than 0.0 and lower than 1.0, the offset amount calculated by blending the detection result of the black level (in other words, the offset amount in the current frame) and the offset amount in the previous frame in accordance with the reliability is applied as the offset amount in the subsequent frames. Here, a case where the reliability is higher than 0.0 and lower than 1.0 corresponds to a case where the number of counts of the black pixels is higher than the threshold th_off and lower than the threshold th_min in the example illustrated in FIG. 8.

As described above, by calculating the offset amount to be applied in the subsequent frames while the offset amount calculated in the previous frame is taken into account, it becomes, for example, possible to suppress precipitous change of the offset amount in a time direction.

As described above, the reliability processing unit 253 calculates the offset amount and causes the offset amount holding unit 255 to hold the calculated offset amount for each frame.

The offset amount holding unit 255 is a storage region for temporarily or permanently holding the offset amount calculated by the reliability processing unit 253. The offset amount held by the offset amount holding unit 255 is, for example, utilized in clamp processing by the correcting unit 260. Further, there is a case where the offset amount held by the offset amount holding unit 255 is, for example, utilized by the reliability processing unit 253 to calculate the offset amount to be applied in the subsequent frames.

Note that the timings at which the detecting unit 240 and the adjusting unit 250 execute the above-described series of processing are not particularly limited. As a specific example, the detecting unit 240 and the adjusting unit 250 may execute the above-described series of processing or at least part of the above-described series of processing at timings at which an image based on the image signals output from the effective pixels becomes hidden, such as upon vertical blank.

Further, the above-described configuration is merely an example, and the configuration is not necessarily limited to the above-described example. As a specific example, at least part of components among the components included in the signal processing unit 210 may be provided outside a device including the signal processing unit 210. Further, the above-described series of processing executed by the detecting unit 240 and the adjusting unit 250 may be, for example, realized as software processing by firmware.

As described above, the second clamp processing unit 230 corrects deviation of the black level by calculating the offset amount on the basis of the output values (that is, image signals) from the black pixels among the effective pixels and correcting the output values from the effective pixels on the basis of the offset amount.

For example, FIGS. 9A, 9B, and 9C are explanatory diagrams for explaining an example of the clamp processing in the present embodiment and illustrates an example of a result of processing of correcting deviation of the black level (that is, clamp processing) by the second clamp processing unit 230. Specifically, FIG. 9A illustrates an example of an imaging result of an image by the image sensor. Note that, in the present description, a rectangular region (hereinafter, also referred to as a "measurement area") illustrated in a lower right portion of the image is made a measurement target of the black level. Further, FIGS. 9B and 9C illustrate histogram of the measurement area. That is, FIGS. 9B and 9C indicate a pixel value on a horizontal axis and indicates the number of pixels indicating the respective pixel values on a vertical axis. Note FIG. 9B illustrates histogram of the measurement area before clamp processing is applied by the second clamp processing unit 230, and FIG. 9C illustrates histogram of the measurement area after clamp processing is applied by the second clamp processing unit 230.

That is, in FIG. 9B, the pixel values in the measurement area indicated in black indicate higher values than the pixel value (that is, 0) indicating the black, that is, so-called deviation of the black level (excessive black) occurs. Therefore, for example, if digital gain is applied to the image signals before clamp processing is applied by the second clamp processing unit 230, influence of this deviation of the black level becomes larger by the digital gain, which eventually makes the influence apparent on the image. To address this, by clamp processing being applied by the second clamp processing unit 230, the pixel values at which deviation of the black level occurs as illustrated in the upper right drawing are corrected to the pixel values indicating black as illustrated in the lower right drawing. That is, even if digital gain is applied to the image signals after clamp processing is applied by the second clamp processing unit 230, it becomes possible to prevent occurrence of a situation where influence of the deviation of the black level becomes apparent on the image, which occurs on the image before the clamp processing is applied.

The configuration of the signal processing unit 210 in the camera module 1 according to an embodiment of the present disclosure has been described above with reference to FIGS. 4, 5, 6, 7A, 7B, 8, 9A, 9B, and 9C while attention is particularly focused on a portion which performs clamp processing on the image signals.

2.2. Functional Configuration of Imaging Device

Figure 10:
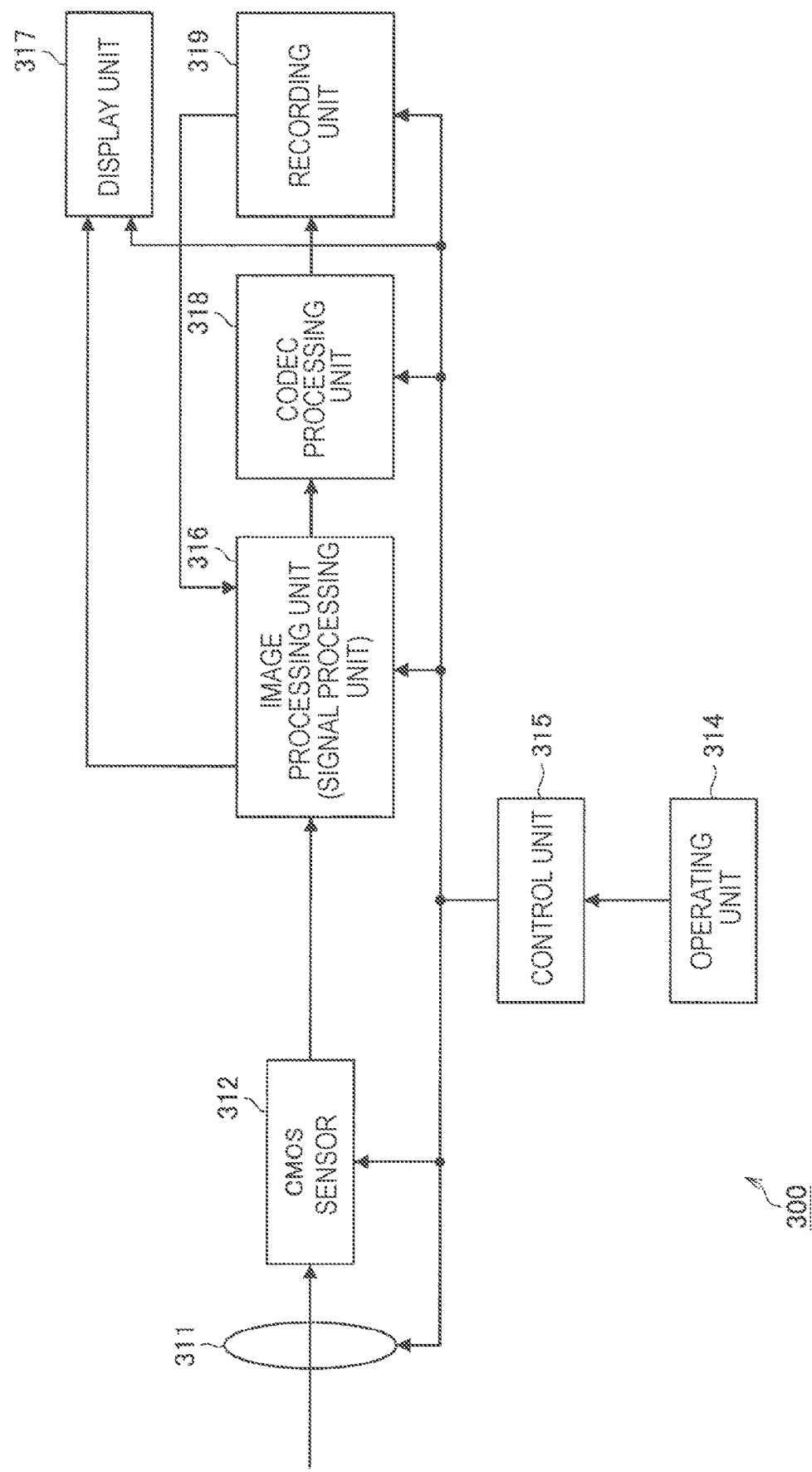
FIG. 10 is a block diagram illustrating an example of a functional configuration of an imaging device according to the embodiment.

Subsequently, an example of a functional configuration of an imaging device to which the camera module according to the present embodiment is applied will be described with reference to FIG. 10. FIG. 10 is a block diagram illustrating an example of the functional configuration of the imaging device according to the present embodiment and illustrates an example in the case where the image sensor 100 and the signal processing LSI 200 described with reference to FIG. 1 are provided in the same chassis. The imaging device 300 illustrated in FIG. 10 is a device which images a subject and outputs an image of the subject as an electrical signal.

As illustrated in FIG. 10, the imaging device 300 includes a lens portion 311, a CMOS sensor 312, an operating unit 314, a control unit 315, an image processing unit 316, a display unit 317, a codec processing unit 318 and a recording unit 319.

The lens portion 311 includes an optical element such as a lens and a diaphragm. The lens portion 311 is controlled by the control unit 315, adjusts a focus to a subject, collects light from a position where the subject is brought into focus, and supplies the light to the CMOS sensor 312.

The CMOS sensor 312, which is an image sensor which images a subject, obtains data (captured image) of the captured image of the subject by performing photoelectric conversion on incident light and performing A/D conversion on pixel values of the respective pixels under control by the control unit 315. The CMOS sensor 312 supplies the captured image data obtained by the imaging to the image processing unit 316 under control by the control unit 315. Note that the CMOS sensor 312 corresponds to the image sensor 100 described with reference to FIG. 1.

The operating unit 314 is configured with, for example, a jog dial (trademark), a key, a button, a touch panel, or the like, receives operation input by the user and supplies a signal corresponding to the operation input to the control unit 315.

The control unit 315 controls the lens portion 311, the CMOS sensor 312, the image processing unit 316, the display unit 317, the codec processing unit 318 and the recording unit 319 on the basis of the signal corresponding to the operation input by the user input by the operating unit 314 and causes each unit to perform processing relating to imaging.

The image processing unit 316 performs various kinds of image processing such as, for example, black level correction, color mixture correction, defect correction, de-mosaic processing, matrix processing, gamma correction, and YC conversion on the image signals supplied from the CMOS sensor 312. Content of this image processing is arbitrary, and processing other than that described above may be performed. The image processing unit 316 supplies the image signals subjected to image processing to the display unit 317 and the codec processing unit 318. Note that the image processing unit 316 corresponds to the signal processing unit 210 described with reference to FIG. 1.

The display unit 317 is, for example, configured as a liquid crystal display, or the like, and displays the subject on the basis of the image signals from the image processing unit 316.

The codec processing unit 318 performs coding processing of a predetermined scheme on the image signals from the image processing unit 316 and supplies image data obtained as a result of the coding processing to the recording unit 319.

The recording unit 319 records the image data from the codec processing unit 318. The image data recorded in the recording unit 319 is supplied to the display unit 317 by being read out to the image processing unit 316 as necessary, so that the corresponding image is displayed.

An example of the functional configuration of the imaging device according to the present embodiment has been described above with reference to FIG. 10.

3. Processing

Subsequently, an example of flow of clamp processing by the camera module 1 according to the present embodiment will be described while attention is particularly focused on processing of the detecting unit 240 and the adjusting unit 250 in the above-mentioned second clamp processing unit 230. Note that, in the present description, it is assumed that the second clamp processing unit 230 performs detection of the black level and calculation of the offset amount for each frame.

Figure 11:
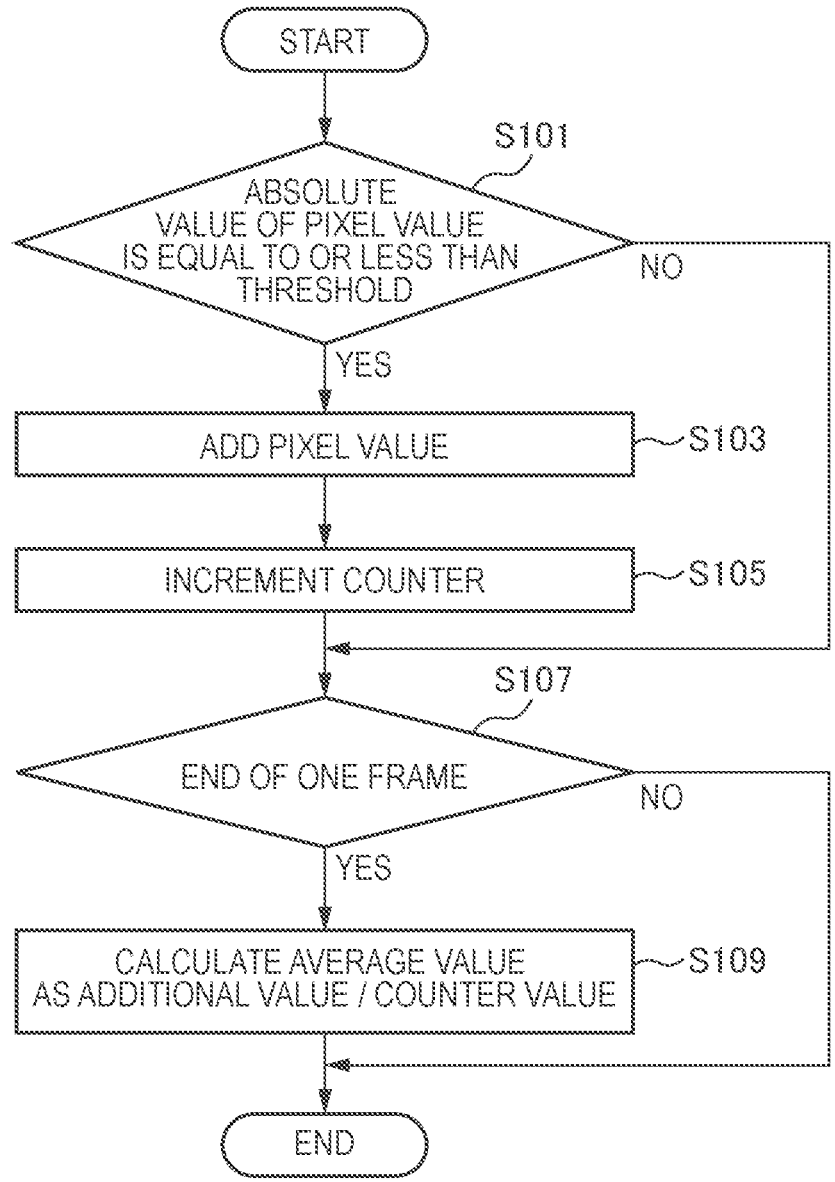
FIG. 11 is a flowchart illustrating an example of flow of processing of a detecting unit in the camera module according to the embodiment.

First, an example of flow of processing of the detecting unit 240 in the camera module 1 according to the present embodiment will be described with reference to FIG. 11. FIG. 11 is a flowchart illustrating an example of the flow of the processing of the detecting unit 240 in the camera module 1 according to the present embodiment.

As illustrated in FIG. 11, the detecting unit 240 determines whether or not absolute values of pixel values of effective pixels indicated by the input signals (that is, output values from the effective pixels) are equal to or less than a threshold (that is, whether or not the pixels are black pixels) (S101). In the case where the absolute values of the pixel values of the effective pixels indicated by the input signals are equal to or less than the threshold (that is, the effective pixels are black pixels) (S101: Yes), the detecting unit 240 performs cumulative addition of the pixel values (S103), and increments a counter for counting the number of black pixels (S105). Note that, in the case where the absolute values of the pixel values exceed the threshold (S101: No), processing indicated with reference numerals S103 and S105 is not executed.

The detecting unit 240 continues a series of processing indicated with reference numerals S101 to S105 on the input signals which are sequentially input until processing on the input signals corresponding to one frame is completed (S107: No).

Then, in the case where the input signal indicates the end of one frame (S107: Yes), the detecting unit 240 calculates an average value of the pixel values of the effective pixels which are black pixels on the basis of an addition result of the pixel values of the effective pixels which are black pixels and a value of the counter for counting the number of black pixels (that is, a count result of the black pixels). The detecting unit 240 then outputs the calculated average value as information indicating a detection result of the black level (S109).

An example of the flow of the processing of the detecting unit 240 in the camera module 1 according to the present embodiment has been described above with reference to FIG. 11.

Figure 12:
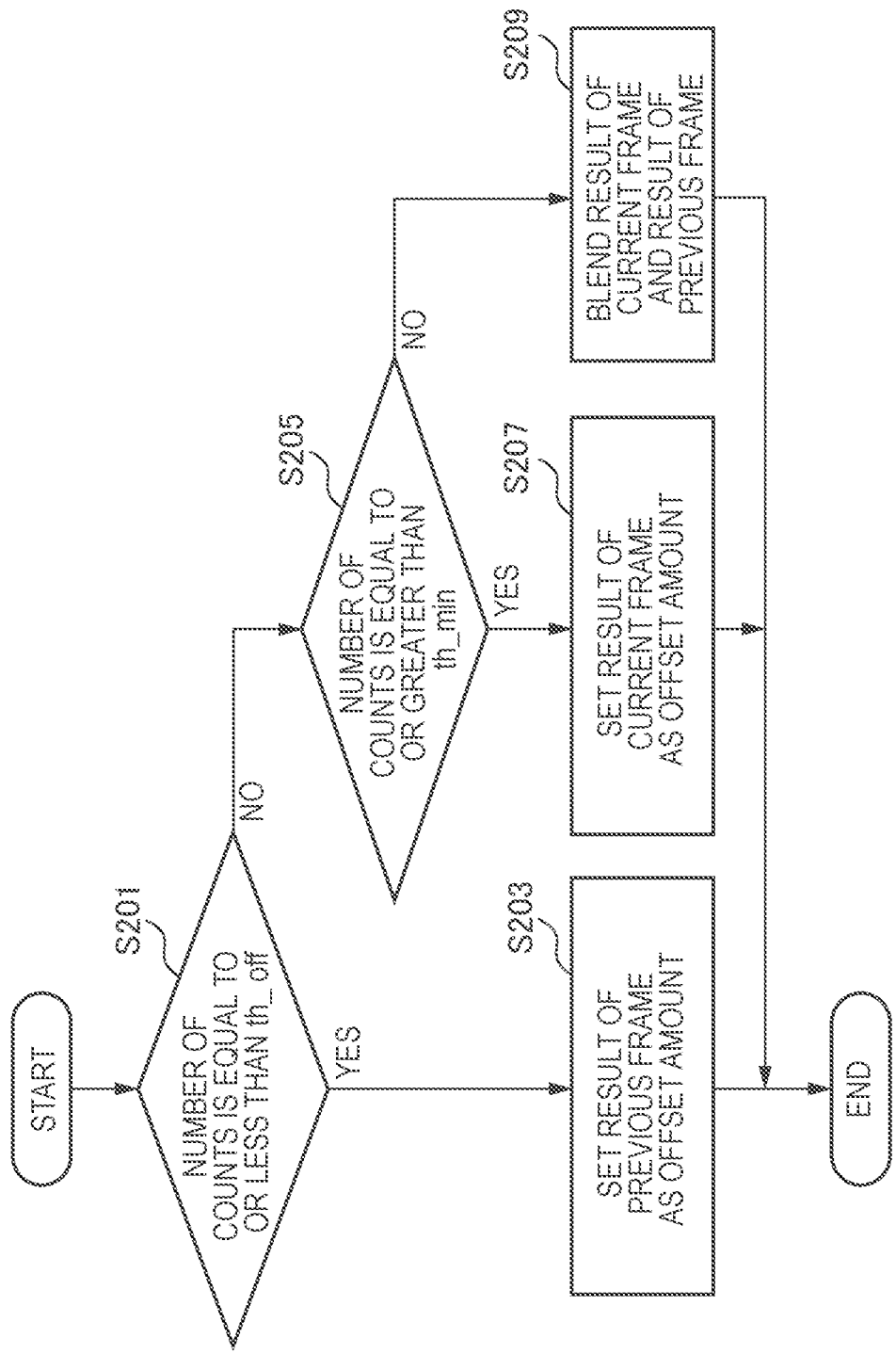
FIG. 12 is a flowchart illustrating an example of flow of processing of an adjusting unit in the camera module according to the embodiment.

Subsequently, an example of flow of processing of the adjusting unit 250 in the camera module 1 according to the present embodiment will be described with reference to FIG. 12. FIG. 12 is a flowchart illustrating an example of the flow of the processing of the adjusting unit 250 in the camera module 1 according to the present embodiment.

As illustrated in FIG. 12, in the case where the number of counts of the black pixels is equal to or less than the threshold th_off (S201: Yes), the adjusting unit 250 sets the reliability at 0.0. In this case, the adjusting unit 250 sets the offset amount calculated in the previous frame (for example, one frame before the frame) as the offset amount to be applied in clamp processing in the subsequent frames (S203).

Further, in the case where the number of counts of the black pixels is equal to or greater than the threshold th_min (S201: No, and S205: Yes), the adjusting unit 250 sets the reliability at 1.0. In this case, the adjusting unit 250 sets the offset amount calculated in the current frame as the offset amount to be applied in clamp processing in the subsequent frames (S207).

Further, in the case where the number of counts of the black pixels is greater than the threshold th_off (S201: No), and less than the threshold th_min (205: No), the adjusting unit 250 determines the reliability within a range between 0.0 and 1.0 in accordance with the number of counts of the number of counts of the black pixels. In this case, the adjusting unit 250 sets a result obtained by blending the offset amount in the current frame and the offset amount in the previous frame in accordance with the reliability as the offset amount to be applied in clamp processing in the subsequent frames (S209).

An example of the flow of the processing of the detecting unit 240 in the camera module 1 according to the present embodiment has been described above with reference to FIG. 11.

4. Modified Examples

Subsequently, modified examples of the camera module according to an embodiment of the present disclosure will be described.

4.1. Modified Example 1: Configuration Example of Signal Processing Unit

First, as modified example 1, an example of a configuration of the above-mentioned signal processing unit 210 will be described. In the example described with reference to FIG. 4, the signal processing unit 210 includes the first clamp processing unit 220 and the second clamp processing unit 230 with respect to the input signals, which respectively perform clamp processing on the input signals in order of the first clamp processing unit 220 and the second clamp processing unit 230. Meanwhile, the configuration of the signal processing unit 210 is not necessarily limited to only the example illustrated in FIG. 4.

As a specific example, the signal processing unit 210 may include only the second clamp processing unit 230. In this case, the signal processing unit 210 detects a black level on the basis of the image signals (that is, the input signals) read out from the effective pixels and executes only processing of correcting a signal level of the image signals on the basis of a detection result of the black level as clamp processing.

Further, as another example, the signal processing unit 210 may be configured to perform clamp processing on the input signals respectively at the second clamp processing unit 230 and the first clamp processing unit 220 in this order. Further, the signal processing unit 210 in this event may selectively execute clamp processing by the first clamp processing unit 220 on the basis of the reliability calculated by the second clamp processing unit 230. As a specific example, the signal processing unit 210 may execute clamp processing by the first clamp processing unit 220 only in the case where the calculated reliability is low (for example, in the case where the reliability is equal to or less than a threshold). According to such a configuration, because execution of the clamp processing by the first clamp processing unit 220 is suppressed in the case where the reliability is high (that is, in the case where the number of black pixels is sufficiently large), it becomes also possible to reduce power consumption.

An example of the configuration of the above-mentioned signal processing unit 210 has been described above as modified example 1.

Figure 13:
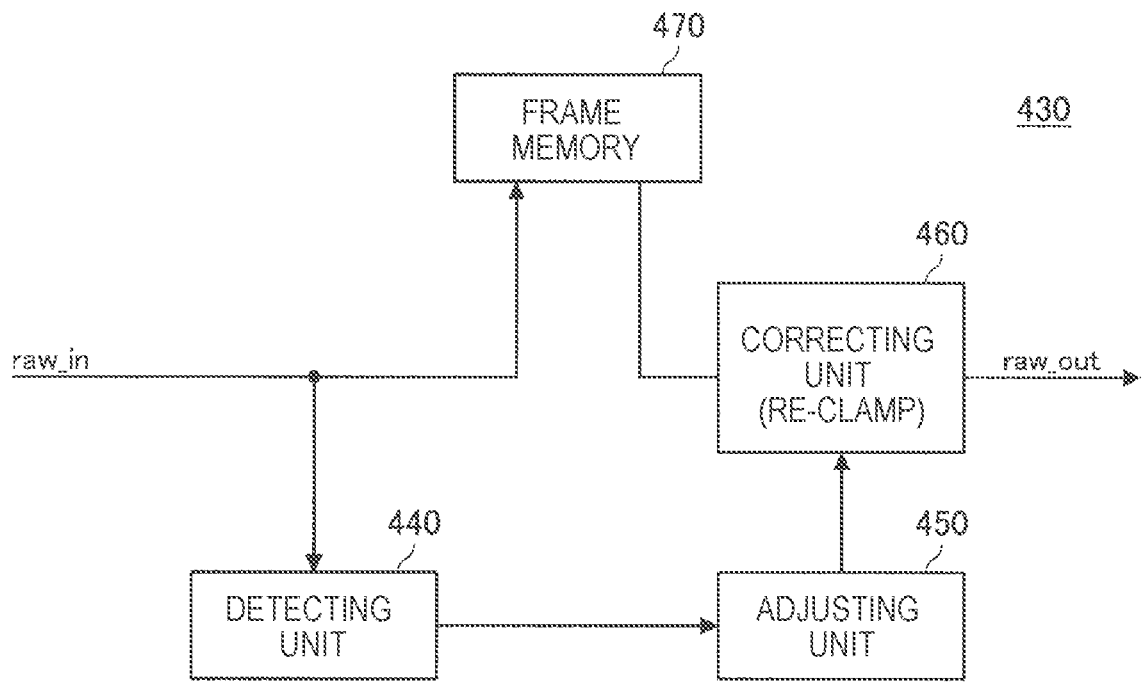
FIG. 13 is an explanatory diagram for explaining an example of a configuration of a second clamp processing unit in a camera module in modified example 2.
Figure 14:
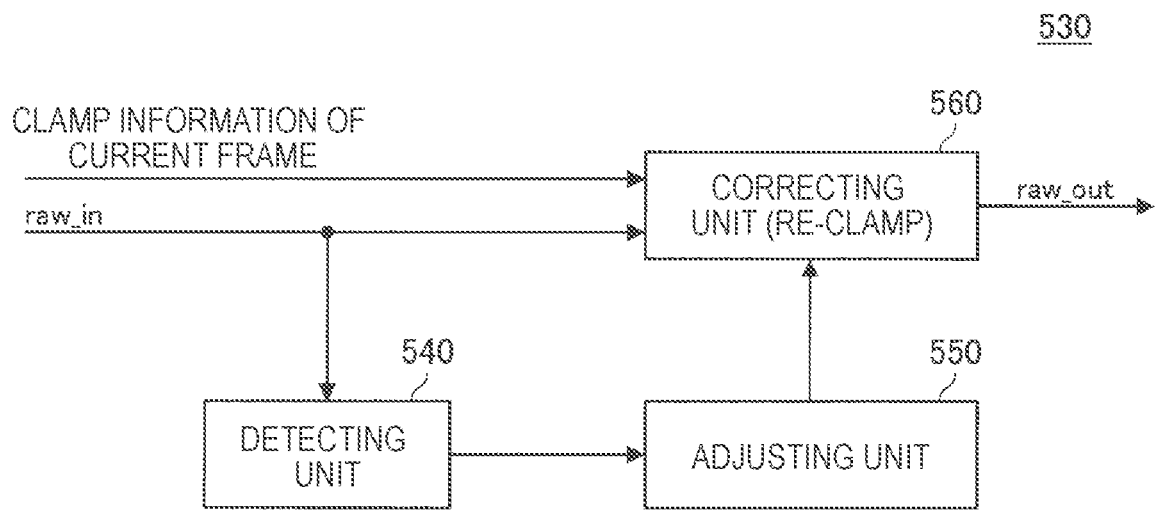
FIG. 14 is an explanatory diagram for explaining an example of a configuration of a second clamp processing unit in a camera module in modified example 2.

4.2. Modified Example 2: Configuration Example of Second Clamp Processing Unit Subsequently, as modified example 2, another example of a configuration of the above-mentioned second clamp processing unit 230 will be described with reference to FIG. 13 and FIG. 14. FIG. 13 and FIG. 14 are explanatory diagrams for explaining an example of the configuration of the second clamp processing unit in the camera module according to modified example 2.

Configuration Including Frame Memory

The example illustrated in FIG. 13 will be described first. At the second clamp processing unit 230 illustrated in FIG. 5, clamp processing is performed on the input image signals in real time. Therefore, at the second clamp processing unit 230, an offset amount calculated on the basis of image signals corresponding to one frame is applied in clamp processing to be performed on image signals corresponding to a frame after the frame due to delay of processing by the detecting unit 240 and the adjusting unit 250.

In contrast to this, at the second clamp processing unit 430 illustrated in FIG. 13, an offset amount calculated on the basis of image signals corresponding to one frame is applied in clamp processing to be performed on the image signals corresponding to the frame by delaying image signals to be input to the correcting unit 460. Specifically, as illustrated in FIG. 13, the second clamp processing unit 430 includes a detecting unit 440, an adjusting unit 450, a correcting unit 460 and a frame memory 470. Note that the detecting unit 440, the adjusting unit 450 and the correcting unit 460 correspond to the detecting unit 240, the adjusting unit 250 and the correcting unit 260 in the second clamp processing unit 230 illustrated in FIG. 5. Therefore, in the present description, operation of the second clamp processing unit 430 will be described while attention is particularly focused on a portion different from the second clamp processing unit 230 illustrated in FIG. 5, and detailed description of a similar portion will be omitted.

Specifically, at the second clamp processing unit 430, the input image signals are temporarily held in the frame memory 470, and the correcting unit 460 reads out the image signals held in the frame memory 470 at a desired timing. According to such a configuration, it becomes possible to delay image signals to be input to the correcting unit 460. That is, if the correcting unit 460 acquires the offset amount calculated on the basis of the image signals corresponding to one frame from the adjusting unit 450, the correcting unit 460 reads out the image signals corresponding to the frame from the frame memory 470 and performs clamp processing on the image signals on the basis of the acquired offset amount.

According to such a configuration, the second clamp processing unit 430 becomes able to alleviate influence of change of the black level which can occur among frames and correct deviation of the black level with higher accuracy.

Configuration Utilizing Result of Other Clamp Processing

Subsequently, the example illustrated in FIG. 14 will be described. The second clamp processing unit 530 illustrated in FIG. 14 utilizes information of clamp processing by the first clamp processing unit located in the preceding stage (that is, information of clamp processing based on the output values of the pixels within the OPB region) in clamp processing executed by the second clamp processing unit 530.

Specifically, as illustrated in FIG. 14, the second clamp processing unit 530 includes a detecting unit 540, an adjusting unit 550 and a correcting unit 560. Note that the detecting unit 540, the adjusting unit 550 and the correcting unit 560 correspond to the detecting unit 240, the adjusting unit 250 and the correcting unit 260 in the second clamp processing unit 230 illustrated in FIG. 5. Therefore, in the present description, operation of the second clamp processing unit 530 will be described while attention is particularly focused on a portion different from the second clamp processing unit 230 illustrated in FIG. 5, and detailed description of a similar portion will be omitted.

Specifically, at the second clamp processing unit 530, the correcting unit 560 acquires information regarding clamp processing corresponding to a current frame (for example, an offset amount) from the first clamp processing unit (for example, the first clamp processing unit 220 illustrated in FIG. 4) located in the preceding stage of the second clamp processing unit 530. The correcting unit 560 then performs clamp processing on the input image signals on the basis of the information acquired from the first clamp processing unit and the offset amount acquired from the adjusting unit 550.

As a specific example, the correcting unit 560 may determine an offset amount to be applied in clamp processing to be performed on the input image signals on the basis of idea similar to that in the example described with reference to FIG. 8 and (equation 2) in accordance with the reliability of the offset amount output from the adjusting unit 550. More specifically, in the case where the reliability is 0.0 (that is, in the case where the number of black pixels is equal to or less than the threshold th_off), the correcting unit 560 may set the offset amount acquired from the first clamp processing unit as the offset amount to be applied in the clamp processing. Further, as another example, in the case where the reliability is 1.0 (that is, in the case where the number of black pixels is equal to or greater than the threshold th_min), the correcting unit 560 may set the offset amount acquired from the adjusting unit 550 as the offset amount to be applied in the clamp processing. Further, as still another example, in the case where the reliability is higher than 0.0 and lower than 1.0 (that is, in the case where the number of black pixels is greater than the threshold th_off and less than the threshold th_min), the correcting unit 560 may calculate the offset amount to be applied in the clamp processing by blending the offset amounts respectively acquired from the first clamp processing unit and the adjusting unit 550 in accordance with the reliability.

According to such a configuration, for example, in a case of an image with a small number of black pixels, the second clamp processing unit 530 becomes able to perform clamp processing on the input image signals on the basis of the information regarding clamp processing acquired from the first clamp processing unit. That is, the second clamp processing unit 530 becomes able to correct deviation of the black level with more preferable aspects in accordance with characteristics of the input image signals (that is, characteristics of the captured image).

Note that the above-described examples are merely an example, and the configuration of the present disclosures is not necessarily limited to only the examples described above. As a specific example, it is also possible to combine the second clamp processing unit 430 illustrated in FIG. 13 and the second clamp processing unit 530 illustrated in FIG. 14.

Another example of the configuration of the above-mentioned second clamp processing unit 230 has been described above with reference to FIG. 13 and FIG. 14 as modified example 2.

4.3. Modified Example 3: Configuration Example of Image Sensor

Figure 15:
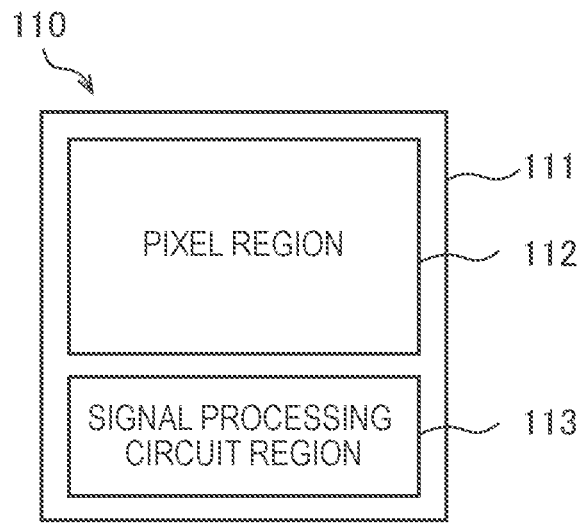
FIG. 15 is an explanatory diagram for explaining an example of a configuration of an image sensor in a camera module according to modified example 3.
Figure 16:
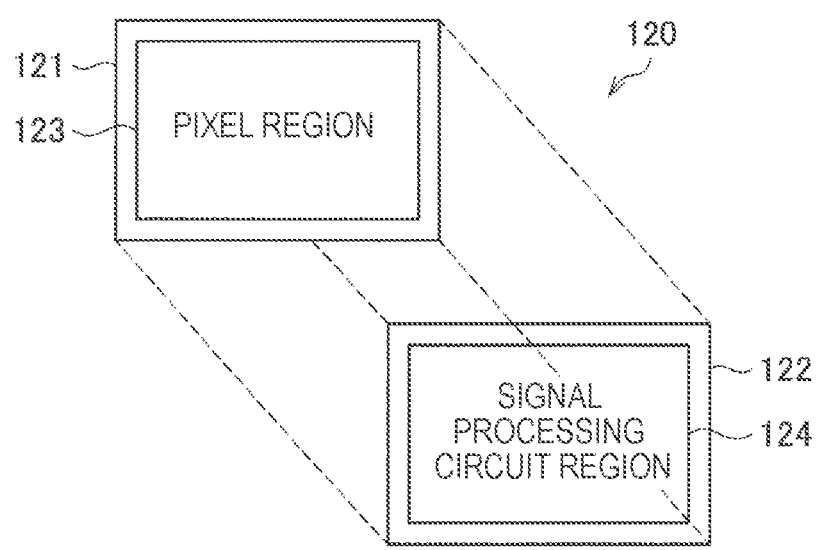
FIG. 16 is an explanatory diagram for explaining an example of a configuration of an image sensor in a camera module according to modified example 3.
Figure 17:
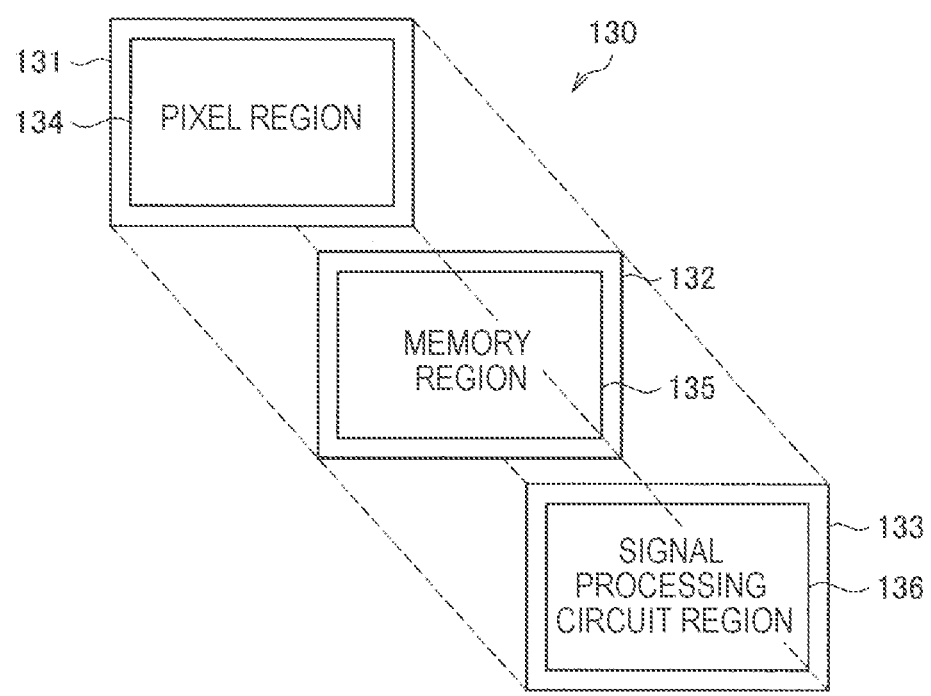
FIG. 17 is an explanatory diagram for explaining an example of a configuration of an image sensor in a camera module according to modified example 3.

Subsequently, an example of a configuration of an image sensor according to an embodiment of the present disclosure will be described with reference to FIG. 15 to FIG. 17 as modified example 3. FIG. 15 to FIG. 17 are explanatory diagrams for explaining an example of the configuration of the image sensor in the camera module according to modified example 3.

First, as a first example, an example of an image sensor in which a plurality of components are mounted within a semiconductor chip will be described with reference to FIG. 15. As illustrated in FIG. 15, the image sensor 110 is configured such that a pixel region 112 (for example, the pixel array portion 101 illustrated in FIG. 1) and a signal processing circuit 113 for realizing the above-mentioned signal processing unit 210 are mounted within one semiconductor chip 111.

An example of the image sensor configured such that a plurality of semiconductor chips are laminated will be described with reference to FIG. 16 as a second example. As illustrated in FIG. 16, the image sensor 120 is configured with a first semiconductor chip 121 and a second semiconductor chip 122. On the first semiconductor chip 121, a pixel region 123 is mounted. Further, on the second semiconductor chip 122, a signal processing circuit 124 for realizing the above-mentioned signal processing unit 210 is mounted. Then, the image sensor 120 as one semiconductor chip is configured by the first semiconductor chip 121 and the second semiconductor chip 122 being electrically connected to each other.

Subsequently, as a third example, another example of the image sensor on which a plurality of semiconductor chips are laminated will be described with reference to FIG. 17. FIG. 17 illustrates an example of the image sensor in which a memory region used as a frame memory, or the like, is provided. As illustrated in FIG. 17, the image sensor 130 is configured with a first semiconductor chip 131, a second semiconductor chip 132 and a third semiconductor chip 133. On the first semiconductor chip 131, a pixel region 134 is mounted. Further, on the second semiconductor chip 132, a memory region 135 used as a frame memory, or the like, is mounted. Still further, on the third semiconductor chip 133, a signal processing circuit 136 for realizing the above-mentioned signal processing unit 210 is mounted. Then, the image sensor 130 as one semiconductor chip is configured by the first semiconductor chip 131, the second semiconductor chip 132 and the third semiconductor chip 133 being electrically connected to one another.

Note that the configurations of the image sensor described as FIG. 15 to FIG. 17 are merely an example and do not necessarily limit the configuration of the image sensor according to an embodiment of the present disclosure. As a specific example, as illustrated in FIG. 16 and FIG. 17, the image sensor may be configured by a plurality of semiconductor chips being laminated, and such that, as illustrated in FIG. 15, a plurality of components are mounted within at least part of the semiconductor chip.

An example of the configuration of the image sensor in the camera module according to an embodiment of the present disclosure has been described above with reference to FIG. 15 to FIG. 17 as modified example 3.

4.4. Modified Example 4: Control Example of Clamp Processing

Figure 19:
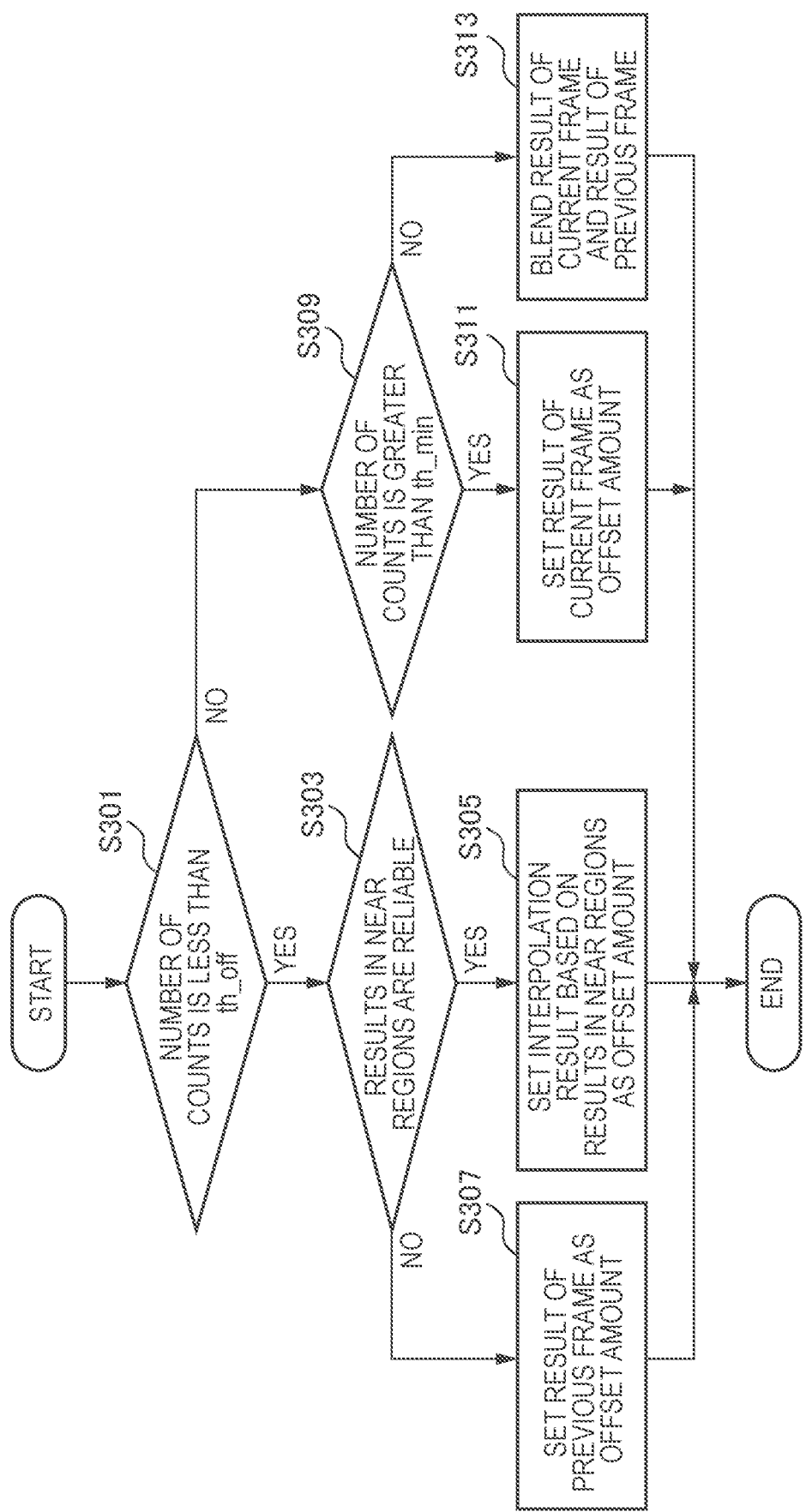
FIG. 19 is an explanatory diagram for explaining outline of the camera module according to modified example 3.
Figure 20:
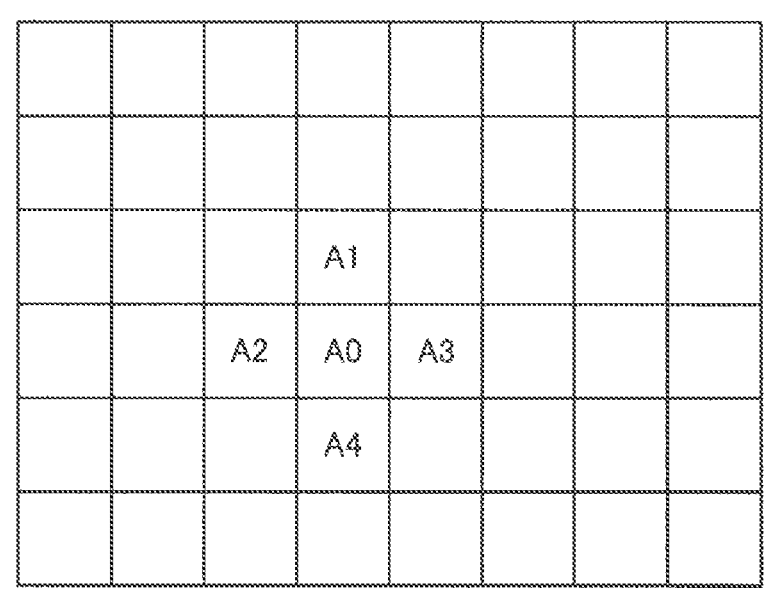

Subsequently, an example of control of clamp processing by the camera module according to an embodiment of the present disclosure will be described as modified example 4 while attention is particularly focused on clamp processing by the second clamp processing unit. In the above-mentioned embodiment, description has been provided while attention is focused on an example where the signal processing unit 210 (particularly, the second clamp processing unit 230) detects a black level for each frame on the basis of the image signals output from the effective pixels, and performs clamp processing on the image signals. Meanwhile, a unit in which the signal processing unit 210 performs clamp processing on the image signals is not necessarily limited to a frame unit. Therefore, in the present modified example, an example of a case will be described where the signal processing unit 210 divides the captured image into a plurality of partial regions, detects a black level for each partial region and performs clamp processing on the image signals. For example, FIG. 18 to FIG. 20 are explanatory diagrams for explaining outline of a camera module according to modified example 3.

For example, FIG. 18 illustrates an example of an aspect where an image is divided into a plurality of partial regions. An upper left drawing in FIG. 18 illustrates an example in the case where an image is not divided into a plurality of partial regions. In contrast to this, for example, as illustrated in a lower left drawing, an image may be divided into a plurality of partial regions in a grid shape. Further, as another example, as illustrated in an upper right drawing, an image may be divided into a plurality of partial regions in a horizontal direction. Further, as still another example, as illustrated in a lower right drawing, an image may be divided into a plurality of partial regions in a vertical direction.

Subsequently, control of each component of the second clamp processing unit 230 will be described while attention is particularly focused on a portion different from that in the above-mentioned embodiment.

Detecting Unit

The detecting unit 240 outputs a detection result of a black level to the adjusting unit 250 for each of the partial regions by executing each processing of cumulative addition of pixel values of black pixels, counting of the number of black pixels and calculation of an average value for each of the partial regions within the image.

Adjusting Unit

The adjusting unit 250, for example, calculates an offset amount to be applied in clamp processing to be performed on a partial region on the basis of a detection result of a black level (in other words, an offset amount in a current frame) and an offset amount in a previous frame for each partial region. In this event, a case can be assumed where the number of black pixels within the partial region of interest is small and reliability of a detection result of the black level in the partial region is low. In such a case, the adjusting unit 250 may, for example, interpolate the detection result of the black level in the partial region of interest on the basis of the detection results of the black levels and the number of black pixels in other partial regions located in the vicinity of the partial region.

Here, an example of processing of the adjusting unit 250 according to modified example 3 will be described in more detail with reference to FIG. 19 and FIG. 20. For example, FIG. 19 is a flowchart illustrating an example of flow of a series of processing of the adjusting unit 250 according to modified example 3. Note that the example illustrated in FIG. 19 is different from the above-mentioned embodiment (see FIG. 12) in processing indicated with reference numerals S303 to S307. Therefore, in the present description, description will be provided while attention is focused on a portion different from the above-mentioned embodiment, and detailed description of other portions will be omitted.

Specifically, in the case where the number of counts of the black pixels in the partial region of interest (hereinafter, also referred to as a "region of interest") is equal to or less than the threshold th_off (S301: Yes), the adjusting unit 250 determines whether or not detection results of the black levels in other partial regions (hereinafter, also referred to as "near regions") located in the vicinity of the partial region are reliable (S303). As a specific example, the adjusting unit 250 may determine whether or not detection results of the black levels in the near regions are reliable in accordance with whether or not the number of counts of black pixels in the near regions exceeds the threshold th_off.

In the case where the detection results of the black levels in the near regions are reliable (S303: Yes), the adjusting unit 250 calculates the offset amount to be applied in the clamp processing in subsequent frames by interpolating the detection result of the black level in the region of interest on the basis of the detection results of the black levels in the near regions.

For example, FIG. 20 is an explanatory diagram for explaining an example of processing in the case where the detection result of the black level of the region of interest is corrected on the basis of the detection results of the black levels in the near regions. FIG. 20 illustrates an example in the case where an image is divided into a plurality of partial regions in a grid shape. Further, in FIG. 20, a reference numeral AO indicates the region of interest, and reference numerals A1 to A4 indicate other partial regions adjacent to the region of interest A0.

Note that, in the example illustrated in FIG. 20, the adjusting unit 250 interpolates a detection result of a black level in the region of interest A0 using the partial regions A1 to A4 as near regions of the region of interest A0.

As a specific example, in the case where the number of black pixels in each of the near regions A1 to A4 exceeds the threshold th_off, the adjusting unit 250 may interpolate the detection result of the black level in the region of interest A0 on the basis of the detection results of the black levels in the respective near regions A1 to A4. Note that an interpolation method is not particularly limited. As a specific example, the adjusting unit 250 may utilize an average value of the detection results of the black levels in the respective near regions A1 to A4 in interpolation of the detection result of the black level in the region of interest A0. Further, as another example, the adjusting unit 250 may weight the detection results of the black levels in the respective near regions A1 to A4 in accordance with reliability of the respective detection results and utilize the weighted detection results in interpolation of the detection result of the black level in the region of interest A0.

Further, as another example, in the case where the number of black pixels is equal to or less than the threshold th_off in part of the near regions A1 to A4, the adjusting unit 250 may utilize only detection results of the black levels in the near regions in which the number of black pixels exceeds the threshold th_off in the above-described interpolation.

Here, processing in the case where the detection results of the black levels in the near regions are not reliable (S303: No) will be described with reference to FIG. 19 again. In this case, the adjusting unit 250, for example, sets the offset amount calculated in the previous frame (for example, one frame before the frame) as the offset amount to be applied in the clamp processing in the subsequent frames (S307).

Note that processing in the case where the number of black pixels in the region of interest exceeds the threshold th_off (S301: No) (that is, processing indicated with reference numerals S309 to S313) is similar to that in the example illustrated in FIG. 12.

Correcting Unit

Concerning the correcting unit 260, clamp processing may be performed on the image signals from the effective pixels within the region of interest on the basis of the offset amount calculated for the region of interest. Further, the correcting unit 260 may interpolate the offset amount to be applied in the clamp processing to be performed on the image signals from the effective pixels within the region of interest on the basis of the offset amounts calculated for the near regions.

Note that, in the case where an image is divided into partial regions, it becomes possible to cope with change of distribution of the offset amounts within the image more flexibly as granularity of the division is finer. Further, it becomes possible to cope with change of distribution of the offset amounts within the image more flexibly by dividing the image in a grid shape compared to a case where the image is divided in a horizontal direction or in a vertical direction. Meanwhile, if distribution profile of the offset amounts can be predicted, it becomes possible to make a circuit scale smaller by dividing the image only in a horizontal direction or only in a vertical direction or making the granularity of division coarser in accordance with a prediction result.

An example of control of the clamp processing by the camera module according to an embodiment of the present disclosure has been described above with reference to FIG. 18 to FIG. 20 as modified example 4 while attention is particularly focused on the clamp processing by the second clamp processing unit.

5. Hardware Configuration

Figure 21:
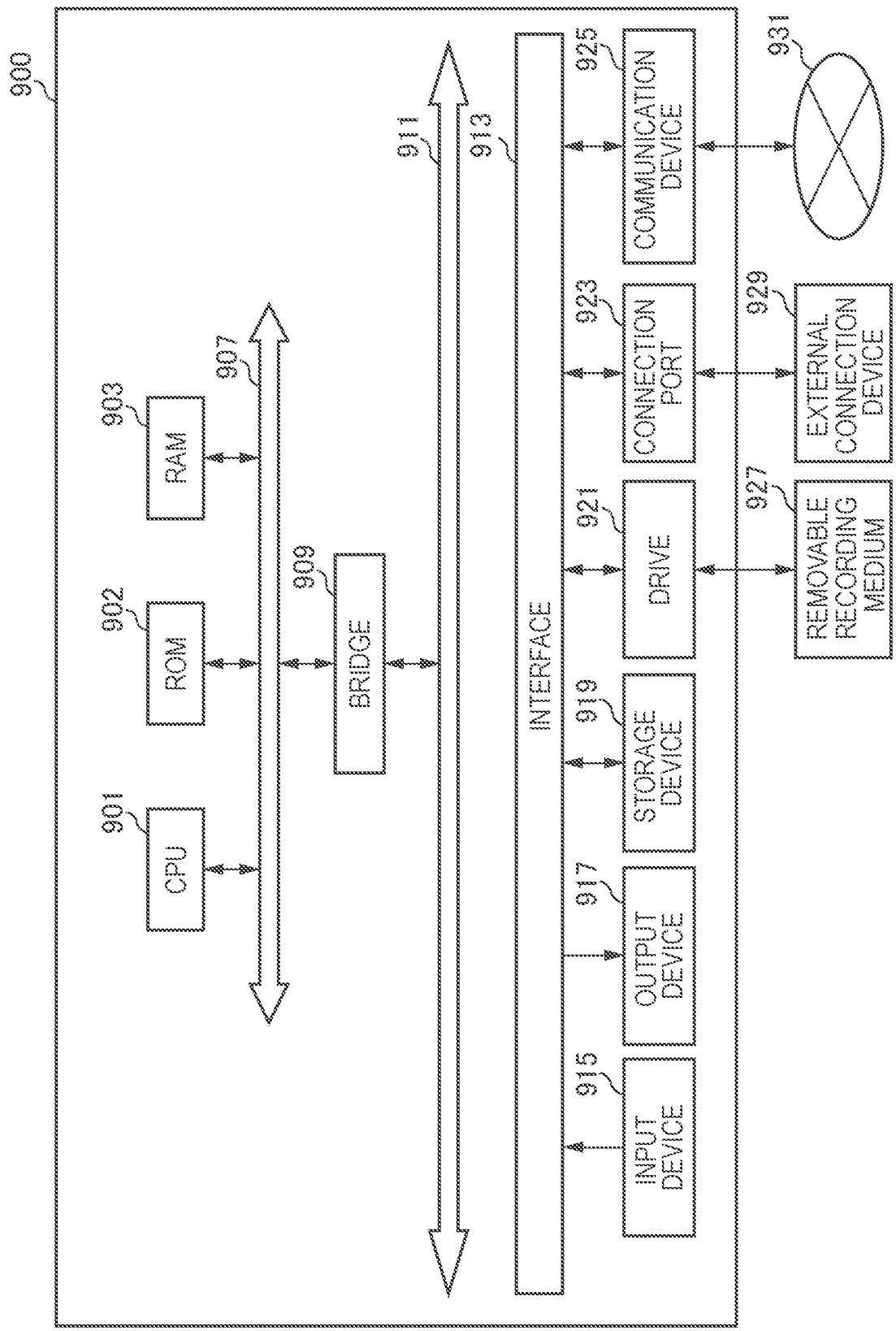
FIG. 21 is a functional block diagram illustrating an example of a hardware configuration of an information processing device for realizing the imaging device according to an embodiment of the present disclosure.

An example of a hardware configuration of the information processing device 900 for realizing an imaging device according to the present embodiment such as a case where the above-mentioned signal processing unit 210 is realized as the signal processing device will be described in detail next with reference to FIG. 21. FIG. 21 is a functional block diagram illustrating an example of the hardware configuration of the information processing device 900 for realizing the imaging device according to an embodiment of the present disclosure.

The information processing device 900 for realizing the imaging device according to an embodiment of the present disclosure mainly includes a CPU 901, a ROM 903, and a RAM 905. Furthermore, the information processing device 900 also includes a host bus 907, a bridge 909, an external bus 911, an interface 913, an input device 915, an output device 917, a storage device 919, a drive 921, a connection port 923, and a communication device 925.

The CPU 901 serves as an arithmetic processing device and a control device, and controls the overall operation or a part of the operation of the information processing device 900 according to various programs recorded in the ROM 903, the RAM 905, the storage device 919, or a removable recording medium 927. The ROM 903 stores programs, operation parameters, and the like used by the CPU 901. The RAM 905 primarily stores programs that the CPU 901 uses and parameters and the like varying as appropriate during the execution of the programs. These are connected with each other via the host bus 907 including an internal bus such as a CPU bus or the like. Note that the signal processing unit 210 mentioned above with reference to FIG. 1 and FIG. 4 to FIG. 6, the image processing unit 316 described with reference to FIG. 10, the codec processing unit 318 and the control unit 315 can be realized by, for example, the CPU 901.

The host bus 907 is connected to the external bus 911 such as a PCI (Peripheral Component Interconnect/Interface) bus via the bridge 909. Additionally, the input device 915, the output device 917, the storage device 919, the drive 921, the connection port 923, and the communication device 925 are connected to the external bus 911 via the interface 913.

The input device 915 is an operation mechanism operated by a user, such as a mouse, a keyboard, a touch panel, buttons, a switch, a lever, or a pedal. Also, the input device 915 may be a remote control mechanism (a so-called remote control) using, for example, infrared light or other radio waves, or may be an external connection device 929 such as a mobile phone or a PDA conforming to the operation of the information processing device 900. Furthermore, the input device 915 generates an input signal based on, for example, information which is input by a user with the above operation mechanism, and includes an input control circuit for outputting the input signal to the CPU 901. The user of the information processing device 900 can input various data to the information processing device 900 and can instruct the information processing device 900 to perform processing by operating the input device 915. Note that the operating unit 314 described above with reference to FIG. 10 can be realized by, for example, the input device 915.

The output device 917 includes a device capable of visually or audibly notifying acquired information to a user. Examples of such device include display devices such as a CRT display device, a liquid crystal display device, a plasma display device, an EL display device and lamps, audio output devices such as a speaker and a headphone, a printer, and the like. For example, the output device 917 outputs a result obtained by various processes performed by the information processing device 900. More specifically, the display device displays, in the form of texts or images, a result obtained by various processes performed by the information processing device 900. On the other hand, the audio output device converts an audio signal including reproduced audio data and sound data into an analog signal, and outputs the analog signal. Note that the display unit 317 described above with reference to FIG. 10 can be realized by, for example, the output device 917.

The storage device 919 is a device for storing data configured as an example of a storage unit of the information processing device 900. The storage device 919 is configured from, for example, a magnetic storage device such as a HDD (Hard Disk Drive), a semiconductor storage device, an optical storage device, or a magneto-optical storage device. This storage device 919 stores programs to be executed by the CPU 901, and various data.

The drive 921 is a reader/writer for recording medium, and is embedded in the information processing device 900 or attached externally thereto. The drive 921 reads information recorded in the attached removable recording medium 927 such as a magnetic disk, an optical disc, a magneto-optical disk, or a semiconductor memory, and outputs the read information to the RAM 905. Furthermore, the drive 921 can write record in the attached removable recording medium 927 such as a magnetic disk, an optical disc, a magneto-optical disk, or a semiconductor memory. The removable recording medium 927 is, for example, a DVD medium, an HD-DVD medium, or a Blu-ray (a registered trademark) medium. In addition, the removable recording medium 927 may be a CompactFlash (CF; a registered trademark), a flash memory, an SD memory card (Secure Digital Memory Card), or the like. Alternatively, the removable recording medium 927 may be, for example, an IC card (Integrated Circuit Card) equipped with a non-contact IC chip or an electronic appliance. Note that the recording unit 319 described above with reference to FIG. 10 can be realized by, for example, at least one of the RAM 905 or the storage device 919.

The connection port 923 is a port for allowing devices to directly connect to the information processing device 900. Examples of the connection port 923 include a USB (Universal Serial Bus) port, an IEEE1394 port, a SCSI (Small Computer System Interface) port, and the like. Other examples of the connection port 923 include an RS-232C port, an optical audio terminal, an HDMI (a registered trademark) (High-Definition Multimedia Interface) port, and the like. By the external connection device 929 connecting to this connection port 923, the information processing device 900 directly obtains various types of data from the external connection device 929 and provides various types of data to the external connection device 929.

The communication device 925 is a communication interface including, for example, a communication device for connecting to a communication network 931. The communication device 925 is, for example, a wired or wireless LAN (Local Area Network), Bluetooth (registered trademark), a communication card for WUSB (Wireless USB), or the like. Alternatively, the communication device 925 may be a router for optical communication, a router for ADSL (Asymmetric Digital Subscriber Line), a modem for various communications, or the like. This communication device 925 can transmit and receive signals and the like in accordance with a predetermined protocol such as TCP/IP on the Internet and with other communication devices, for example. The communication network 931 connected to the communication device 925 includes a network and the like, which is connected via wire or wirelessly, and may be, for example, the Internet, a home LAN, infrared communication, radio wave communication, satellite communication, or the like.

Heretofore, an example of the hardware configuration capable of realizing the functions of the information processing device 900 for realizing the imaging device according to an embodiment of the present disclosure has been shown. Each of the structural elements described above may be configured using a general-purpose material, or may be implemented by hardware dedicated to the function of each structural element. Accordingly, the hardware configuration to be used can be changed as appropriate according to the technical level at the time of carrying out the present embodiment. Note that, although not shown in FIG. 21, for example, it naturally includes various configurations corresponding to the information processing device 900 for realizing the imaging device according to an embodiment of the present disclosure according to the present embodiment.

Note that it is also possible to develop a computer program for realizing the respective functions of the information processing device 900 for realizing the imaging device according to the present embodiment as discussed above, and implement the computer program in a personal computer or the like. In addition, a computer-readable recording medium storing such a computer program may also be provided. The recording medium may be a magnetic disk, an optical disc, a magneto-optical disk, or flash memory, for example. Furthermore, the above computer program may also be delivered via a network, for example, without using a recording medium. In addition, the number of computers causing the computer program to be executed is not particularly limited. For example, the computer program may be executed in cooperation of a plurality of computers (for example, a plurality of servers or the like). Note that a single computer or a plurality of cooperating computers is also referred to as "computer system."

6. Application Examples

Subsequently, application examples of the camera module according to the present embodiment will be described. The camera module can be applied to various kinds of electronic equipment which senses, for example, visible light, infrared light, ultraviolet, an X-ray, or the like.

As a specific example, the above-described camera module can be applied to electronic equipment which captures an image provided for appreciation, such as the above-mentioned digital camera and mobile equipment with a camera function (for example, a smartphone or a tablet terminal). Further, the above-described camera module can be also applied to electronic equipment provided to be used for sports, such as an action camera and a wearable camera to be used for sports. Still further, the above-described camera module can be also applied to electronic equipment provided for security, such as a security camera to be used to prevent crimes and a camera to be used to perform person authentication. Further, the above-described camera module can be also applied to electronic equipment provided to be used for agriculture, such as a camera for monitoring states of the fields and crops.

Further, the above-described camera module can be also applied to electronic equipment provided to be used for medical care and health care, such as an endoscope and a device which performs angiography by reception of infrared light. Still further, the above-described camera module can be also applied to electronic equipment provided to be used for traffic such as an onboard sensor which shoots ahead, behind, around a car, or interior, or the like, of a car, a security camera which monitors traveling vehicles and roads, and a ranging sensor which measures a distance between vehicles, or the like, for safe driving such as automatic stop, recognition of a state of a driver, or the like. Note that the example of application to medical care and the example of application to a mobile body such as a vehicle will be described in more detail below using specific examples.

6.1. Example of Application to Medical Care

First, as the example of application to medical care, an example in the case where the above-described camera module is applied to an endoscopic surgery system will be described.

Figure 22:
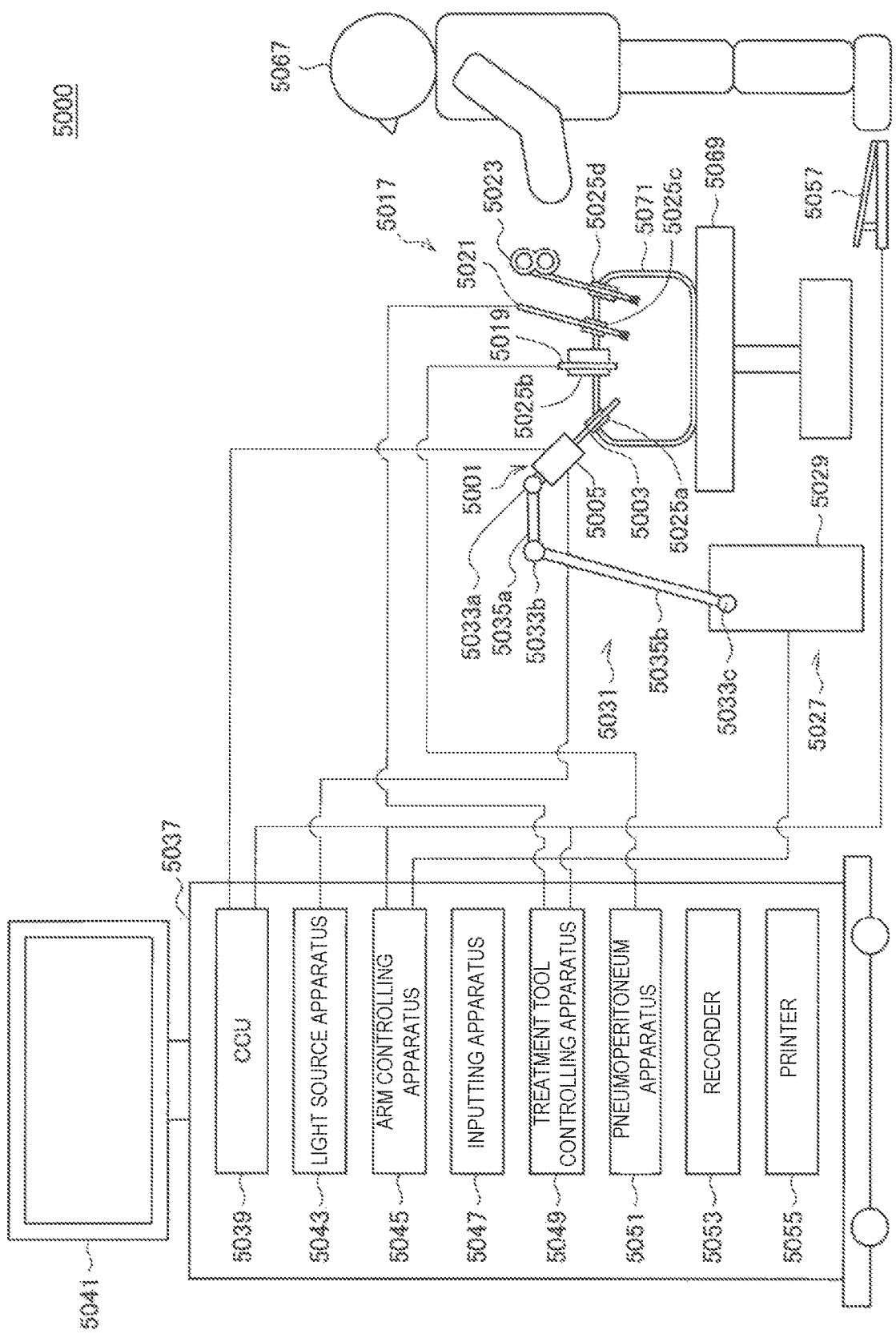
FIG. 22 is a view depicting an example of a schematic configuration of an endoscopic surgery system.

FIG. 22 is a view depicting an example of a schematic configuration of an endoscopic surgery system 5000 to which the technology according to an embodiment of the present disclosure can be applied. In FIG. 22, a state is illustrated in which a surgeon (medical doctor) 5067 is using the endoscopic surgery system 5000 to perform surgery for a patient 5071 on a patient bed 5069. As depicted, the endoscopic surgery system 5000 includes an endoscope 5001, other surgical tools 5017, a supporting arm apparatus 5027 which supports the endoscope 5001 thereon, and a cart 5037 on which various apparatus for endoscopic surgery are mounted.

In endoscopic surgery, in place of incision of the abdominal wall to perform laparotomy, a plurality of tubular aperture devices called trocars 5025a to 5025d are used to puncture the abdominal wall. Then, a lens barrel 5003 of the endoscope 5001 and the other surgical tools 5017 are inserted into body cavity of the patient 5071 through the trocars 5025a to 5025d. In the example depicted, as the other surgical tools 5017, a pneumoperitoneum tube 5019, an energy device 5021 and forceps 5023 are inserted into body cavity of the patient 5071. Further, the energy device 5021 is a treatment tool for performing incision and peeling of a tissue, sealing of a blood vessel or the like by high frequency current or ultrasonic vibration. However, the surgical tools 5017 depicted are mere examples at all, and as the surgical tools 5017, various surgical tools which are generally used in endoscopic surgery such as, for example, tweezers or a retractor may be used.

An image of a surgical region in a body cavity of the patient 5071 imaged by the endoscope 5001 is displayed on a display apparatus 5041. The surgeon 5067 would use the energy device 5021 or the forceps 5023 while watching the image of the surgical region displayed on the display apparatus 5041 on the real time basis to perform such treatment as, for example, resection of an affected area. It is to be noted that, though not depicted, the pneumoperitoneum tube 5019, the energy device 5021 and the forceps 5023 are supported by the surgeon 5067, an assistant or the like during surgery.

Supporting Arm Apparatus

The supporting arm apparatus 5027 includes an arm unit 5031 extending from a base unit 5029. In the example depicted, the arm unit 5031 includes joint portions 5033a, 5033b and 5033c and links 5035a and 5035b and is driven under the control of an arm controlling apparatus 5045. The endoscope 5001 is supported by the arm unit 5031 such that the position and the posture of the endoscope 5001 are controlled. Consequently, stable fixation in position of the endoscope 5001 can be implemented.

Endoscope

The endoscope 5001 includes the lens barrel 5003 which has a region of a predetermined length from a distal end thereof to be inserted into a body cavity of the patient 5071, and a camera head 5005 connected to a proximal end of the lens barrel 5003. In the example depicted, the endoscope 5001 is depicted as a rigid endoscope having the lens barrel 5003 of the hard type. However, the endoscope 5001 may otherwise be configured as a flexible endoscope having the lens barrel 5003 of the flexible type.

The lens barrel 5003 has, at a distal end thereof, an opening in which an objective lens is fitted. A light source apparatus 5043 is connected to the endoscope 5001 such that light generated by the light source apparatus 5043 is introduced to a distal end of the lens barrel by a light guide extending in the inside of the lens barrel 5003 and is irradiated toward an observation target in a body cavity of the patient 5071 through the objective lens. It is to be noted that the endoscope 5001 may be a forward-viewing endoscope or may be an oblique-viewing endoscope or a side-viewing endoscope.

An optical system and an image pickup element are provided in the inside of the camera head 5005 such that reflected light (observation light) from an observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 5039. It is to be noted that the camera head 5005 has a function incorporated therein for suitably driving the optical system of the camera head 5005 to adjust the magnification and the focal distance.

It is to be noted that, in order to establish compatibility with, for example, a stereoscopic vision (three dimensional (3D) display), a plurality of image pickup elements may be provided on the camera head 5005. In this case, a plurality of relay optical systems are provided in the inside of the lens barrel 5003 in order to guide observation light to each of the plurality of image pickup elements.

Various Apparatus Incorporated in Cart

The CCU 5039 includes a central processing unit (CPU), a graphics processing unit (GPU) or the like and integrally controls operation of the endoscope 5001 and the display apparatus 5041. In particular, the CCU 5039 performs, for an image signal received from the camera head 5005, various image processes for displaying an image based on the image signal such as, for example, a development process (demosaic process). The CCU 5039 provides the image signal for which the image processes have been performed to the display apparatus 5041. Further, the CCU 5039 transmits a control signal to the camera head 5005 to control driving of the camera head 5005. The control signal may include information relating to an image pickup condition such as a magnification or a focal distance.

The display apparatus 5041 displays an image based on an image signal for which the image processes have been performed by the CCU 5039 under the control of the CCU 5039. If the endoscope 5001 is ready for imaging of a high resolution such as 4K (horizontal pixel number 3840× vertical pixel number 2160), 8K (horizontal pixel number 7680×vertical pixel number 4320) or the like and/or ready for 3D display, then a display apparatus by which corresponding display of the high resolution and/or 3D display are possible may be used as the display apparatus 5041. Where the apparatus is ready for imaging of a high resolution such as 4K or 8K, if the display apparatus used as the display apparatus 5041 has a size of equal to or not less than 55 inches, then a more immersive experience can be obtained. Further, a plurality of display apparatus 5041 having different resolutions and/or different sizes may be provided in accordance with purposes.

The light source apparatus 5043 includes a light source such as, for example, a light emitting diode (LED) and supplies irradiation light for imaging of a surgical region to the endoscope 5001.

The arm controlling apparatus 5045 includes a processor such as, for example, a CPU and operates in accordance with a predetermined program to control driving of the arm unit 5031 of the supporting arm apparatus 5027 in accordance with a predetermined controlling method.

An inputting apparatus 5047 is an input interface for the endoscopic surgery system 5000. A user can perform inputting of various kinds of information or instruction inputting to the endoscopic surgery system 5000 through the inputting apparatus 5047. For example, the user would input various kinds of information relating to surgery such as physical information of a patient, information regarding a surgical procedure of the surgery and so forth through the inputting apparatus 5047. Further, the user would input, for example, an instruction to drive the arm unit 5031, an instruction to change an image pickup condition (type of irradiation light, magnification, focal distance or the like) by the endoscope 5001, an instruction to drive the energy device 5021 or the like through the inputting apparatus 5047.

The type of the inputting apparatus 5047 is not limited and may be that of any one of various known inputting apparatus. As the inputting apparatus 5047, for example, a mouse, a keyboard, a touch panel, a switch, a foot switch 5057 and/or a lever or the like may be applied. Where a touch panel is used as the inputting apparatus 5047, it may be provided on the display face of the display apparatus 5041.

Otherwise, the inputting apparatus 5047 is a device to be mounted on a user such as, for example, a glasses type wearable device or a head mounted display (HMD), and various kinds of inputting are performed in response to a gesture or a line of sight of the user detected by any of the devices mentioned. Further, the inputting apparatus 5047 includes a camera which can detect a motion of a user, and various kinds of inputting are performed in response to a gesture or a line of sight of a user detected from a video imaged by the camera. Further, the inputting apparatus 5047 includes a microphone which can collect the voice of a user, and various kinds of inputting are performed by voice collected by the microphone. By configuring the inputting apparatus 5047 such that various kinds of information can be inputted in a contactless fashion in this manner, especially a user who belongs to a clean area (for example, the surgeon 5067) can operate an apparatus belonging to an unclean area in a contactless fashion. Further, since the user can operate an apparatus without releasing a possessed surgical tool from its hand, the convenience to the user is improved.

A treatment tool controlling apparatus 5049 controls driving of the energy device 5021 for cautery or incision of a tissue, sealing of a blood vessel or the like. A pneumoperitoneum apparatus 5051 feeds gas into a body cavity of the patient 5071 through the pneumoperitoneum tube 5019 to inflate the body cavity in order to secure the field of view of the endoscope 5001 and secure the working space for the surgeon. A recorder 5053 is an apparatus capable of recording various kinds of information relating to surgery. A printer 5055 is an apparatus capable of printing various kinds of information relating to surgery in various forms such as a text, an image or a graph.

In the following, especially a characteristic configuration of the endoscopic surgery system 5000 is described in more detail.

Supporting Arm Apparatus

The supporting arm apparatus 5027 includes the base unit 5029 serving as a base, and the arm unit 5031 extending from the base unit 5029. In the example depicted, the arm unit 5031 includes the plurality of joint portions 5033a, 5033b and 5033c and the plurality of links 5035a and 5035b connected to each other by the joint portion 5033b. In FIG. 22, for simplified illustration, the configuration of the arm unit 5031 is depicted in a simplified form. Actually, the shape, number and arrangement of the joint portions 5033a to 5033c and the links 5035a and 5035b and the direction and so forth of axes of rotation of the joint portions 5033a to 5033c can be set suitably such that the arm unit 5031 has a desired degree of freedom. For example, the arm unit 5031 may preferably be configured such that it has a degree of freedom equal to or not less than 6 degrees of freedom. This makes it possible to move the endoscope 5001 freely within the movable range of the arm unit 5031. Consequently, it becomes possible to insert the lens barrel 5003 of the endoscope 5001 from a desired direction into a body cavity of the patient 5071.

An actuator is provided in each of the joint portions 5033a to 5033c, and the joint portions 5033a to 5033c are configured such that they are rotatable around predetermined axes of rotation thereof by driving of the respective actuators. The driving of the actuators is controlled by the arm controlling apparatus 5045 to control the rotational angle of each of the joint portions 5033a to 5033c thereby to control driving of the arm unit 5031. Consequently, control of the position and the posture of the endoscope 5001 can be implemented. Thereupon, the arm controlling apparatus 5045 can control driving of the arm unit 5031 by various known controlling methods such as force control or position control.

For example, if the surgeon 5067 suitably performs operation inputting through the inputting apparatus 5047 (including the foot switch 5057), then driving of the arm unit 5031 may be controlled suitably by the arm controlling apparatus 5045 in response to the operation input to control the position and the posture of the endoscope 5001. After the endoscope 5001 at the distal end of the arm unit 5031 is moved from an arbitrary position to a different arbitrary position by the control just described, the endoscope 5001 can be supported fixedly at the position after the movement. It is to be noted that the arm unit 5031 may be operated in a master-slave fashion. In this case, the arm unit 5031 may be remotely controlled by the user through the inputting apparatus 5047 which is placed at a place remote from the operating room.

Further, where force control is applied, the arm controlling apparatus 5045 may perform power-assisted control to drive the actuators of the joint portions 5033a to 5033c such that the arm unit 5031 may receive external force by the user and move smoothly following the external force. This makes it possible to move, when the user directly touches with and moves the arm unit 5031, the arm unit 5031 with comparatively weak force. Accordingly, it becomes possible for the user to move the endoscope 5001 more intuitively by a simpler and easier operation, and the convenience to the user can be improved.

Here, generally in endoscopic surgery, the endoscope 5001 is supported by a medical doctor called scopist. In contrast, where the supporting arm apparatus 5027 is used, the position of the endoscope 5001 can be fixed more certainly without hands, and therefore, an image of a surgical region can be obtained stably and surgery can be performed smoothly.

It is to be noted that the arm controlling apparatus 5045 may not necessarily be provided on the cart 5037. Further, the arm controlling apparatus 5045 may not necessarily be a single apparatus. For example, the arm controlling apparatus 5045 may be provided in each of the joint portions 5033a to 5033c of the arm unit 5031 of the supporting arm apparatus 5027 such that the plurality of arm controlling apparatus 5045 cooperate with each other to implement driving control of the arm unit 5031.

Light Source Apparatus

The light source apparatus 5043 supplies irradiation light upon imaging of a surgical region to the endoscope 5001. The light source apparatus 5043 includes a white light source which includes, for example, an LED, a laser light source or a combination of them. In this case, where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 5043. Further, in this case, if laser beams from the respective RGB laser light sources are irradiated time-divisionally on an observation target and driving of the image pickup elements of the camera head 5005 is controlled in synchronism with the irradiation timings, then images individually corresponding to the R, G and B colors can be picked up time-divisionally. According to the method just described, a color image can be obtained even if a color filter is not provided for the image pickup element.

Further, driving of the light source apparatus 5043 may be controlled such that the intensity of light to be outputted is changed for each predetermined time. By controlling driving of the image pickup element of the camera head 5005 in synchronism with the timing of the change of the intensity of light to acquire images time-divisionally and synthesizing the images, an image of a high dynamic range free from underexposed blocked up shadows and overexposed highlights can be created.

Further, the light source apparatus 5043 may be configured to supply light of a predetermined wavelength band ready for special light observation. In special light observation, for example, by utilizing the wavelength dependency of absorption of light in a body tissue to irradiate light of a narrower wavelength band in comparison with irradiation light upon ordinary observation (namely, white light), narrow band light observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 5043 can be configured to supply such narrow-band light and/or excitation light suitable for special light observation as described above.

Camera Head and CCU

Figure 23:
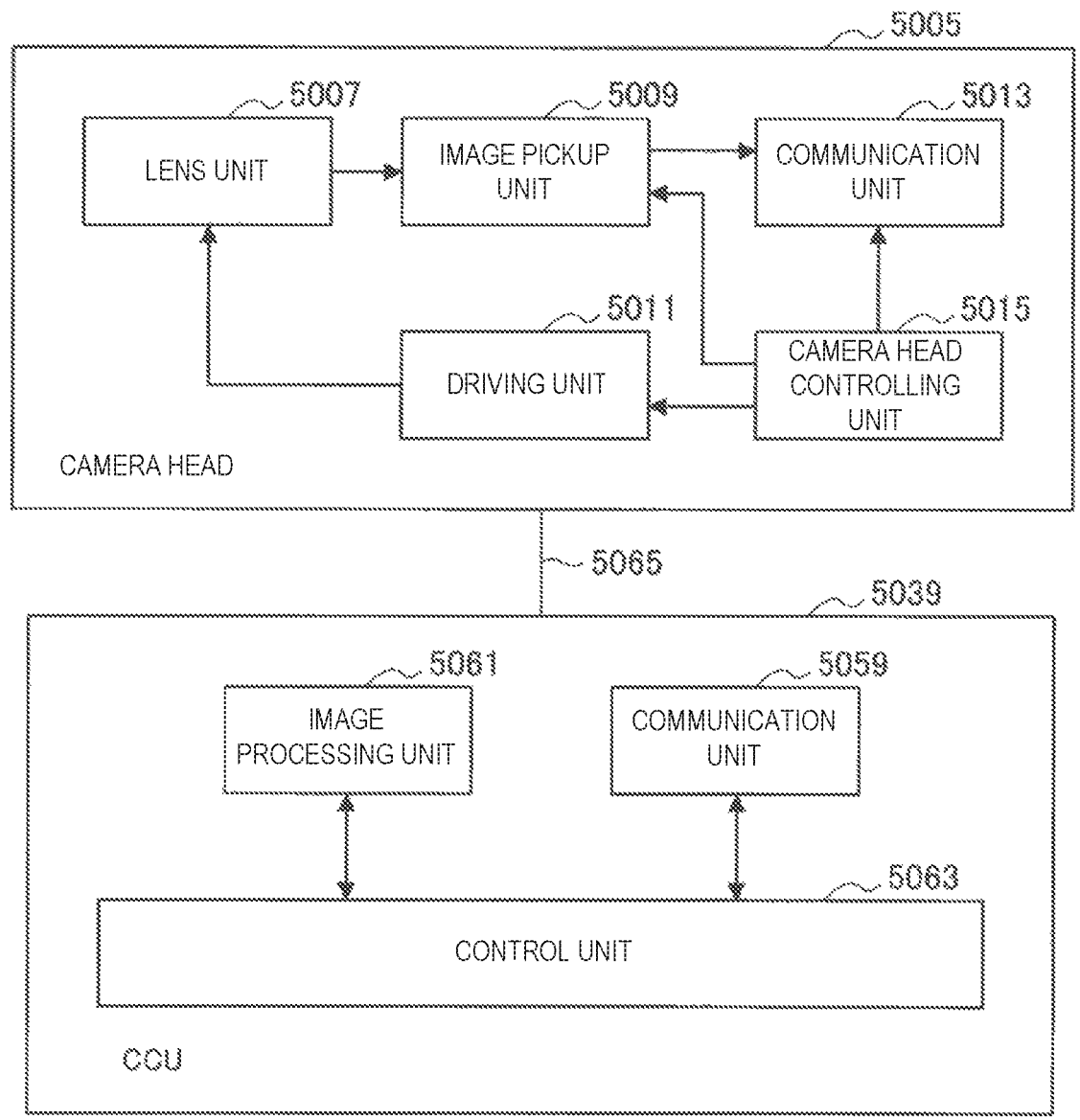
FIG. 23 is a block diagram depicting an example of a functional configuration of a camera head and a camera control unit (CCU) depicted in FIG. 22.

Functions of the camera head 5005 of the endoscope 5001 and the CCU 5039 are described in more detail with reference to FIG. 23. FIG. 23 is a block diagram depicting an example of a functional configuration of the camera head 5005 and the CCU 5039 depicted in FIG. 22.

Referring to FIG. 23, the camera head 5005 has, as functions thereof, a lens unit 5007, an image pickup unit 5009, a driving unit 5011, a communication unit 5013 and a camera head controlling unit 5015. Further, the CCU 5039 has, as functions thereof, a communication unit 5059, an image processing unit 5061 and a control unit 5063. The camera head 5005 and the CCU 5039 are connected to be bidirectionally communicable to each other by a transmission cable 5065.

First, a functional configuration of the camera head 5005 is described. The lens unit 5007 is an optical system provided at a connecting location of the camera head 5005 to the lens barrel 5003. Observation light taken in from a distal end of the lens barrel 5003 is introduced into the camera head 5005 and enters the lens unit 5007. The lens unit 5007 includes a combination of a plurality of lenses including a zoom lens and a focusing lens. The lens unit 5007 has optical properties adjusted such that the observation light is condensed on a light receiving face of the image pickup element of the image pickup unit 5009. Further, the zoom lens and the focusing lens are configured such that the positions thereof on their optical axis are movable for adjustment of the magnification and the focal point of a picked up image.

The image pickup unit 5009 includes an image pickup element and disposed at a succeeding stage to the lens unit 5007. Observation light having passed through the lens unit 5007 is condensed on the light receiving face of the image pickup element, and an image signal corresponding to the observation image is generated by photoelectric conversion of the image pickup element. The image signal generated by the image pickup unit 5009 is provided to the communication unit 5013.

As the image pickup element which is included by the image pickup unit 5009, an image sensor, for example, of the complementary metal oxide semiconductor (CMOS) type is used which has a Bayer array and is capable of picking up an image in color. It is to be noted that, as the image pickup element, an image pickup element may be used which is ready, for example, for imaging of an image of a high resolution equal to or not less than 4K. If an image of a surgical region is obtained in a high resolution, then the surgeon 5067 can comprehend a state of the surgical region in enhanced details and can proceed with the surgery more smoothly.

Further, the image pickup element which is included by the image pickup unit 5009 includes such that it has a pair of image pickup elements for acquiring image signals for the right eye and the left eye compatible with 3D display. Where 3D display is applied, the surgeon 5067 can comprehend the depth of a living body tissue in the surgical region more accurately. It is to be noted that, if the image pickup unit 5009 is configured as that of the multi-plate type, then a plurality of systems of lens units 5007 are provided correspondingly to the individual image pickup elements of the image pickup unit 5009.

The image pickup unit 5009 may not necessarily be provided on the camera head 5005. For example, the image pickup unit 5009 may be provided just behind the objective lens in the inside of the lens barrel 5003.

The driving unit 5011 includes an actuator and moves the zoom lens and the focusing lens of the lens unit 5007 by a predetermined distance along the optical axis under the control of the camera head controlling unit 5015. Consequently, the magnification and the focal point of a picked up image by the image pickup unit 5009 can be adjusted suitably.

The communication unit 5013 includes a communication apparatus for transmitting and receiving various kinds of information to and from the CCU 5039. The communication unit 5013 transmits an image signal acquired from the image pickup unit 5009 as RAW data to the CCU 5039 through the transmission cable 5065. Thereupon, in order to display a picked up image of a surgical region in low latency, preferably the image signal is transmitted by optical communication. This is because, upon surgery, the surgeon 5067 performs surgery while observing the state of an affected area through a picked up image, it is demanded for a moving image of the surgical region to be displayed on the real time basis as far as possible in order to achieve surgery with a higher degree of safety and certainty. Where optical communication is applied, a photoelectric conversion module for converting an electric signal into an optical signal is provided in the communication unit 5013. After the image signal is converted into an optical signal by the photoelectric conversion module, it is transmitted to the CCU 5039 through the transmission cable 5065.

Further, the communication unit 5013 receives a control signal for controlling driving of the camera head 5005 from the CCU 5039. The control signal includes information relating to image pickup conditions such as, for example, information that a frame rate of a picked up image is designated, information that an exposure value upon image picking up is designated and/or information that a magnification and a focal point of a picked up image are designated. The communication unit 5013 provides the received control signal to the camera head controlling unit 5015. It is to be noted that also the control signal from the CCU 5039 may be transmitted by optical communication. In this case, a photoelectric conversion module for converting an optical signal into an electric signal is provided in the communication unit 5013. After the control signal is converted into an electric signal by the photoelectric conversion module, it is provided to the camera head controlling unit 5015.

It is to be noted that the image pickup conditions such as the frame rate, exposure value, magnification or focal point are set automatically by the control unit 5063 of the CCU 5039 on the basis of an acquired image signal. In other words, an auto exposure (AE) function, an auto focus (AF) function and an auto white balance (AWB) function are incorporated in the endoscope 5001.

The camera head controlling unit 5015 controls driving of the camera head 5005 on the basis of a control signal from the CCU 5039 received through the communication unit 5013. For example, the camera head controlling unit 5015 controls driving of the image pickup element of the image pickup unit 5009 on the basis of information that a frame rate of a picked up image is designated and/or information that an exposure value upon image picking up is designated. Further, for example, the camera head controlling unit 5015 controls the driving unit 5011 to suitably move the zoom lens and the focus lens of the lens unit 5007 on the basis of information that a magnification and a focal point of a picked up image are designated. The camera head controlling unit 5015 may further include a function for storing information for identifying the lens barrel 5003 and/or the camera head 5005.

It is to be noted that, by disposing the components such as the lens unit 5007 and the image pickup unit 5009 in a sealed structure having high airtightness and waterproof, the camera head 5005 can be provided with resistance to an autoclave sterilization process.

Now, a functional configuration of the CCU 5039 is described. The communication unit 5059 includes a communication apparatus for transmitting and receiving various kinds of information to and from the camera head 5005. The communication unit 5059 receives an image signal transmitted thereto from the camera head 5005 through the transmission cable 5065. Thereupon, the image signal may be transmitted preferably by optical communication as described above. In this case, for the compatibility with optical communication, the communication unit 5059 includes a photoelectric conversion module for converting an optical signal into an electric signal. The communication unit 5059 provides the image signal after conversion into an electric signal to the image processing unit 5061.

Further, the communication unit 5059 transmits, to the camera head 5005, a control signal for controlling driving of the camera head 5005. The control signal may also be transmitted by optical communication.

The image processing unit 5061 performs various image processes for an image signal in the form of RAW data transmitted thereto from the camera head 5005. The image processes include various known signal processes such as, for example, a development process, an image quality improving process (a bandwidth enhancement process, a super-resolution process, a noise reduction (NR) process and/or an image stabilization process) and/or an enlargement process (electronic zooming process). Further, the image processing unit 5061 performs a detection process for an image signal in order to perform AE, AF and AWB.

The image processing unit 5061 includes a processor such as a CPU or a GPU, and when the processor operates in accordance with a predetermined program, the image processes and the detection process described above can be performed. It is to be noted that, where the image processing unit 5061 includes a plurality of GPUs, the image processing unit 5061 suitably divides information relating to an image signal such that image processes are performed in parallel by the plurality of GPUs.

The control unit 5063 performs various kinds of control relating to image picking up of a surgical region by the endoscope 5001 and display of the picked up image. For example, the control unit 5063 generates a control signal for controlling driving of the camera head 5005. Thereupon, if image pickup conditions are inputted by the user, then the control unit 5063 generates a control signal on the basis of the input by the user. Alternatively, where the endoscope 5001 has an AE function, an AF function and an AWB function incorporated therein, the control unit 5063 suitably calculates an optimum exposure value, focal distance and white balance in response to a result of a detection process by the image processing unit 5061 and generates a control signal.

Further, the control unit 5063 controls the display apparatus 5041 to display an image of a surgical region on the basis of an image signal for which image processes have been performed by the image processing unit 5061. Thereupon, the control unit 5063 recognizes various objects in the surgical region image using various image recognition technologies. For example, the control unit 5063 can recognize a surgical tool such as forceps, a particular living body region, bleeding, mist when the energy device 5021 is used and so forth by detecting the shape, color and so forth of edges of the objects included in the surgical region image. The control unit 5063 causes, when it controls the display unit 5041 to display a surgical region image, various kinds of surgery supporting information to be displayed in an overlapping manner with an image of the surgical region using a result of the recognition. Where surgery supporting information is displayed in an overlapping manner and presented to the surgeon 5067, the surgeon 5067 can proceed with the surgery more safety and certainty.

The transmission cable 5065 which connects the camera head 5005 and the CCU 5039 to each other is an electric signal cable ready for communication of an electric signal, an optical fiber ready for optical communication or a composite cable ready for both of electrical and optical communication.

Here, while, in the example depicted, communication is performed by wired communication using the transmission cable 5065, the communication between the camera head 5005 and the CCU 5039 may be performed otherwise by wireless communication. Where the communication between the camera head 5005 and the CCU 5039 is performed by wireless communication, there is no necessity to lay the transmission cable 5065 in the operating room. Therefore, such a situation that movement of medical staff in the operating room is disturbed by the transmission cable 5065 can be eliminated.

An example of the endoscopic surgery system 5000 to which the technology according to an embodiment of the present disclosure can be applied has been described above. It is to be noted here that, although the endoscopic surgery system 5000 has been described as an example, the system to which the technology according to an embodiment of the present disclosure can be applied is not limited to the example. For example, the technology according to an embodiment of the present disclosure may be applied to a flexible endoscopic system for inspection or a microscopic surgery system.

The technology according to the present disclosure can be preferably applied to the imaging unit 5009 among the above-described components. Specifically, the imaging unit 5009 may include the image sensor 100 and the signal processing LSI 200 described with reference to FIG. 1. By the imaging device according to the present disclosure being applied as the imaging unit 5009, for example, it becomes possible to obtain a sharper image of a surgerical portion in which influence of deviation of the black level is alleviated or suppressed even if shooting is performed with high sensitivity, which results in enabling safer and more reliable surgery.

6.2. Example of Application to Mobile Body

First, as the example of application to a vehicle, an example in the case where the above-described camera module is applied to a device mounted on a mobile body of one of a car, an electric car, a hybrid electric car, an electric two-wheel vehicle, a bicycle, a personal mobility, an airplane, a drone, a ship, a robot, constructing machine and agricultural machine (tractor) will be described.

Figure 24:
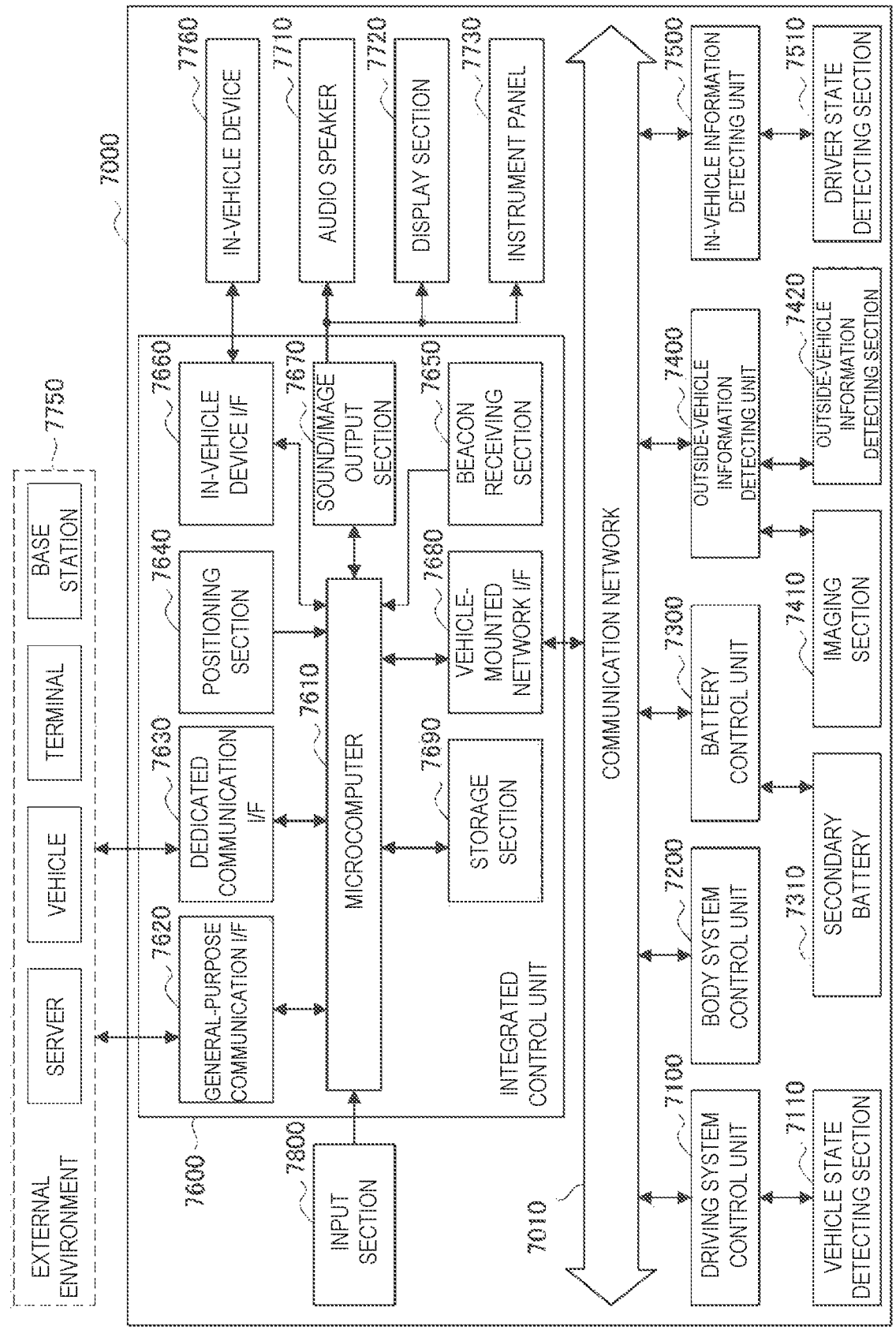
FIG. 24 is a block diagram depicting an example of a schematic configuration of a vehicle control system.

FIG. 24 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 24, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay, or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 24 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 25:
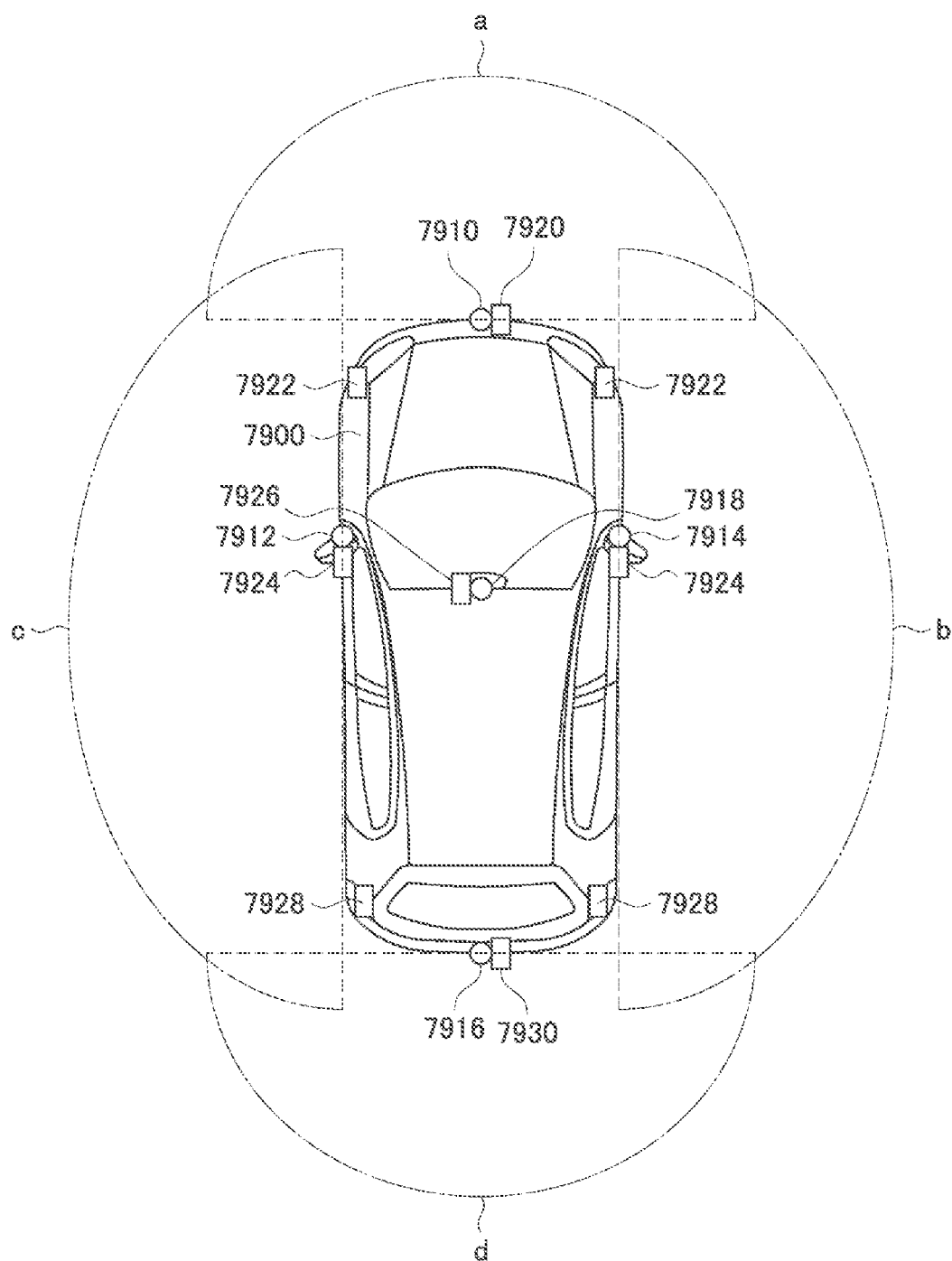
FIG. 25 is a diagram of assistance in explaining an example of installation positions of an outside-vehicle information detecting section and an imaging section.

FIG. 25 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 25 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 24, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM), worldwide interoperability for microwave access (WiMAX), long term evolution (LTE)), LTE-advanced (LTE-A), or the like, or another wireless communication protocol such as wirelesLAN (referred to also as wireless fidelity (Wi-Fi), Bluetooth, or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 24, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 24 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

Note that a computer program for realizing each function of the camera module 1 according to the present embodiment described using FIG. 1 and FIG. 4 to FIG. 6 can be implemented on any control unit, or the like. Further, it is also possible to provide a computer readable recording medium in which such a computer program is stored. The recording medium is, for example, a magnetic disk, an optical disk, a magnetooptical disk, a flash memory, or the like. Further, the above-described computer program may be delivered, for example, via a network without using a recording medium. Note that the above-described HDMI and GSM are registered trademarks.

In the vehicle control system 7000 described above, the camera module 1 according to the present embodiment described using FIG. 1 and FIG. 4 to FIG. 6 can be applied to the imaging unit 7410 in the application example illustrated in FIG. 24.

Further, at least part of components (for example, the signal processing unit 210) of the camera module 1 described using FIG. 1 and FIG. 4 to FIG. 6 may be realized at a module for the integrated control unit 7600 (for example, an integrated circuit module configured with one die) illustrated in FIG. 24. Alternatively, at least part of components of the camera module 1 described using FIG. 1 and FIG. 4 to FIG. 6 may be realized with a plurality of control units of the vehicle control system 7000 illustrated in FIG. 24.

7. Conclusion

As described above, the camera module according to an embodiment of the present disclosure adjusts an offset amount on the basis of output values of effective pixels (that is, black pixels) for which the output values (that is, pixel values) are equal to or less than a threshold among a plurality of effective pixels included in at least part of a region of a light receiving surface. The camera module then performs clamp processing on the output values of the effective pixels (that is, corrects the output values) on the basis of the adjusted offset amount.

According to such a configuration, the camera module according to an embodiment of the present disclosure can detect a black level on the basis of output values of more pixels compared to a case where a black level is detected only from output values of pixels in the OPB region, particularly, in an image of a scene with a number of black pixels. Therefore, because the camera module is less subject to influence of a dark current, readout noise, or the like, it becomes possible to correct deviation of the black level with higher accuracy.

Further, as mentioned above, in the case where the black level is detected only with output values of the pixels within the OPB region, there is a case where deviation of the black level occurs between the OPB region and the effective pixel region. In contrast to this, because the camera module according to an embodiment of the present disclosure is less subject to influence of deviation occurring between different regions as mentioned above as a result of the camera module directly detecting a black level on the basis of the output values of the effective pixels, it becomes possible to correct deviation of the black level with higher accuracy.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A signal processing device including:

an adjusting unit configured to adjust an offset amount on a basis of output values of effective pixels for which the output values are equal to or less than a threshold among a plurality of effective pixels included in at least part of a region of a light receiving surface; and a correcting unit configured to correct the output values of the effective pixels on a basis of the adjusted offset amount.

(2)

The signal processing device according to (1), in which the light receiving surface includes an effective pixel region in which the effective pixels are arranged, and an optical black region in which pixels at which incident light from outside is blocked are arranged, and the correcting unit corrects the output values of the effective pixels on a basis of a first offset amount which is the offset amount and a second offset amount based on the output values of the pixels included in the optical black region.

(3)

The signal processing device according to (2), in which the correcting unit corrects the output values of the effective pixels on a basis of the second offset amount, and corrects the corrected output values on a basis of the first offset amount.

(4)

The signal processing device according to (2), in which the correcting unit corrects the output values on a basis of the first offset amount in a case where a number of the effective pixels for which the output values are equal to or less than the threshold is equal to or larger than a predetermined number, and corrects the output values on a basis of the second offset amount in a case where the number of the effective pixels for which the output values are equal to or less than the threshold is smaller than the predetermined number.

(5)

The signal processing device according to any one of (1) to (4), in which the adjusting unit calculates reliability on a basis of a number of the effective pixels for which the output values are equal to or less than the threshold, and adjusts the offset amount on a basis of the output values of the effective pixels and the reliability.

(6)

The signal processing device according to (2), in which the adjusting unit calculates reliability on a basis of a number of the effective pixels for which the output values are equal to or less than the threshold, and the correcting unit corrects the output values on a basis of the second offset amount in a case where the reliability is equal to or lower than a first predetermined value, corrects the output values on a basis of the first offset amount in a case where the reliability is equal to or higher than a second predetermined value which is higher than the first predetermined value, and corrects the output values on a basis of the first offset amount and the second offset amount in a case where the reliability is higher than the first predetermined value and lower than the second predetermined value.

(7)

The signal processing device according to any one of (1) to (6), including:

a holding unit configured to hold the respective output values of the plurality of effective pixels for each frame, in which the adjusting unit adjusts the offset amount for each frame on a basis of the output values output in the frame, and the correcting unit corrects the output values held in the holding unit for each frame on a basis of the offset amount corresponding to the frame.

(8)

The signal processing device according to any one of (1) to (6), in which the adjusting unit adjusts the offset amount for each frame on a basis of the output values output in the frame, and the correcting unit corrects the output values output in a frame after the frame on a basis of the offset amount adjusted for each frame.

(9)

The signal processing device according to any one of (1) to (8), in which the adjusting unit adjusts the offset amount for each frame on a basis of the output values output in the frame and the offset amount adjusted in a frame prior to the frame.

(10)

The signal processing device according to (9), in which the adjusting unit calculates reliability for each frame on a basis of a number of the effective pixels for which the output values are equal to or less than the threshold, determines the offset amount corresponding to a second frame prior to a first frame for which the reliability is calculated as the offset amount corresponding to the first frame in a case where the reliability is equal to or lower than a first predetermined value, determines the offset amount based on the output values output in the first frame as the offset amount corresponding to the first frame in a case where the reliability is equal to or higher than a second predetermined value which is higher than the first predetermined value, and adjusts the offset amount corresponding to the first frame on a basis of the offset amount based on the output values output in the first frame and the offset amount corresponding to the second frame in a case where the reliability is higher than the first predetermined value and lower than the second predetermined value.

(11)
The signal processing device according to any one of (1) to (10),
in which the adjusting unit adjusts the offset amount during a period in which an image based on the respective output values of the plurality of effective pixels is hidden.

(12)
The signal processing device according to any one of (1) to (11),
in which the adjusting unit adjusts the offset amount on a basis of the output values of the effective pixels included in a partial region for each of a plurality of partial regions on the light receiving surface, and
the correcting unit corrects the output values of the effective pixels included in the partial region on a basis of the offset amount adjusted for each of the partial regions.

(13)
The signal processing device according to (12),
in which the adjusting unit adjusts the offset amount corresponding to a first partial region among a plurality of the partial regions on a basis of the offset amount corresponding to a second partial region located in a vicinity of the first partial region.

(14)
An imaging device including:
a light receiving surface including a plurality of effective pixels;
an adjusting unit configured to adjust an offset amount on a basis of output values of effective pixels for which the output values are equal to or less than a threshold among the effective pixels included in at least part of a region of the light receiving surface; and
a correcting unit configured to correct the output values of the effective pixels on a basis of the adjusted offset amount.

(15)
The imaging device according to (14),
in which a laminated structure in which a plurality of semiconductor substrates are laminated is formed, and
the light receiving surface and a circuit which operates as at least one of the adjusting unit or the correcting unit are formed on the semiconductor substrates which are different from each other.

(16)
The imaging device according to (14),
in which the light receiving surface and a circuit which operates as at least one of the adjusting unit or the correcting unit are formed on a common semiconductor substrate.

(17)
A signal processing method including, by a processor:
adjusting an offset amount on a basis of output values of effective pixels for which the output values are equal to or less than a threshold among a plurality of effective pixels included in at least part of a region of a light receiving surface; and
correcting the output values of the effective pixels on a basis of the adjusted offset amount.

REFERENCE SIGNS LIST 1 camera module
100 image sensor
101 pixel array portion
210 signal processing unit
220 first clamp processing unit
230 second clamp processing unit
240 detecting unit
241 black pixel determining unit
243 black pixel adding unit
245 black pixel counter
247 average value calculating unit
250 adjusting unit
251 reliability calculating unit
253 reliability processing unit
255 offset amount holding unit
260 correcting unit
300 imaging device
311 lens portion
312 sensor
314 operating unit
315 control unit
316 image processing unit
317 display unit
318 codec processing unit
319 recording unit

The invention claimed is:
1. A signal processing device, comprising:
a central processing unit (CPU) configured to:
calculate a reliability value based on a number of specific effective pixels among a plurality of effective pixels, wherein
the plurality of effective pixels is included in a part of a region of a light receiving surface of an image sensor, and
an output value of each of the specific effective pixels is equal to or less than a threshold value;
adjust a first offset amount based on output values of the specific effective pixels and the calculated reliability value; and
correct output values of the plurality of effective pixels based on the adjusted first offset amount.

2. The signal processing device according to claim 1, wherein
the light receiving surface includes an effective pixel region and an optical black region,
the plurality of effective pixels is arranged in the effective pixel region,
in the optical black region, pixels at which incident light from outside is blocked are arranged,
the CPU is further configured to correct the output values of the plurality of effective pixels based on the first offset amount and a second offset amount, and
the second offset amount is based on output values of the pixels included in the optical black region.

3. The signal processing device according to claim 2, wherein the CPU is further configured to:
correct the output values of the plurality of effective pixels based on the second offset amount; and
correct the corrected output values of the plurality of effective pixels based on the first offset amount.

4. The signal processing device according to claim 2, wherein the CPU is further configured to:
correct the output values of the plurality of effective pixels based on the first offset amount, when the number of the specific effective pixels is one of equal to or larger than a first number; and
correct the output values of the plurality of effective pixels based on the second offset amount, when the number of the specific effective pixels is smaller than a second number, wherein the first number is greater than the second number.

5. The signal processing device according to claim 2, wherein the CPU is further configured to:
   correct the output values of the plurality of effective pixels based on the second offset amount, when the reliability value is equal to a first value;
   correct the output values of the plurality of effective pixels based on the first offset amount, when the reliability value is equal to a second value higher than the first value; and
   correct the output values of the plurality of effective pixels based on the first offset amount and the second offset amount, when the reliability value is higher than the first value and lower than the second value.

6. The signal processing device according to claim 1, further comprising a storage device, wherein
   the storage device is configured to hold the output values of the plurality of effective pixels for each frame of a plurality of frames, and
   the CPU is further configured to:
      adjust the first offset amount for each frame of the plurality of frames based on the output values of the respective specific effective pixels; and
      correct the held output values of the plurality of effective pixels for each frame of the plurality of frames based on the respective adjusted first offset amount.

7. The signal processing device according to claim 1, wherein
   the CPU is further configured to:
      adjust the first offset amount for each frame of a plurality of frames, based on the output values of the respective specific effective pixels; and
      correct the output values of the plurality of effective pixels output in a first frame of the plurality of frames, based on the adjusted first offset amount for a second frame of the plurality of frames, wherein the first frame is subsequent to the second frame.

8. The signal processing device according to claim 1, wherein
   the CPU is further configured to adjust the first offset amount for a first frame of a plurality of frames, based on the output values of the specific effective pixels output in the first frame and the adjusted first offset amount in a second frame of the plurality of frames, and
   the second frame is prior to the first frame.

9. The signal processing device according to claim 8, wherein the CPU is further configured to:
   calculate the reliability value for each frame of the plurality of frames based on the number of the respective specific effective pixels;
   determine the first offset amount corresponding to the second frame as the first offset amount corresponding to the first frame, when the reliability value of the first frame is equal to a first value;
   determine the first offset amount based on the output values of the specific effective pixels output in the first frame as the first offset amount corresponding to the first frame, when the reliability value is equal to a second value higher than the first value; and
   adjust the first offset amount corresponding to the first frame based on the output values of the specific effective pixels output in the first frame and the first offset amount corresponding to the second frame, when the reliability value is higher than the first value and lower than the second value.

10. The signal processing device according to claim 1, wherein
   the CPU is further configured to adjust the first offset amount in a period in which an image based on the respective output values of corresponding effective pixels of the plurality of effective pixels is hidden.

11. The signal processing device according to claim 1, wherein the CPU is further configured to:
   adjust the first offset amount based on the output values of the specific effective pixels included in each of a plurality of partial regions on the light receiving surface; and
   correct the output values of the plurality of effective pixels included in each of the plurality of partial regions based on the adjusted respective first offset amount.

12. The signal processing device according to claim 11, wherein
   the CPU is further configured to adjust the first offset amount corresponding to a first partial region among the plurality of partial regions, based on the first offset amount corresponding to a second partial region of the plurality of partial regions, and
   the second partial region is located in a vicinity of the first partial region.

13. An imaging device, comprising:
   a light receiving surface including a plurality of effective pixels; and
   a central processing unit (CPU) configured to:
      calculate a reliability value based on a number of specific effective pixels among the plurality of effective pixels, wherein an output value of each of the specific effective pixels is equal to or less than a threshold value;
      adjust an offset amount based on output values of the specific effective pixels and the calculated reliability value; and
      correct output values of the plurality of effective pixels based on the adjusted offset amount.

14. The imaging device according to claim 13, further comprising a laminated structure, wherein
   the laminated structure comprises a plurality of laminated semiconductor substrates,
   the light receiving surface is on a first semiconductor substrate of the plurality of laminated semiconductor substrates,
   the CPU is on a second semiconductor substrate of the plurality of laminated semiconductor substrates, and
   the first semiconductor substrate is different from the second semiconductor substrate.

15. The imaging device according to claim 13, further comprising a plurality of semiconductor substrates, wherein the light receiving surface and the CPU are on a common semiconductor substrate of the plurality of semiconductor substrates.

16. A signal processing method, comprising:
   by a processor:
   calculating a reliability value based on a number of specific effective pixels among a plurality of effective pixels, wherein
      the plurality of effective pixels is included in a part of a region of a light receiving surface of an image sensor, and
      an output value of each of the specific effective pixels is equal to or less than a threshold value;
   adjusting an offset amount based on output values of the specific effective pixels and the calculated reliability value; and correcting output values of the plurality of effective pixels based on the adjusted offset amount.

17. A signal processing device, comprising:
a central processing unit (CPU) configured to:
adjust a first offset amount based on output values of specific effective pixels of a plurality of effective pixels, wherein
the plurality of effective pixels is included in a light receiving surface of an image sensor,
an output value of each of the specific effective pixels is equal to or less than a threshold value,
the light receiving surface includes an effective pixel region and an optical black region,
the plurality of effective pixels is arranged in the effective pixel region, and
in the optical black region, pixels at which incident light from outside is blocked are arranged; and
correct output values of the plurality of effective pixels based on one of the first offset amount or a second offset amount, wherein
the second offset amount is based on output values of the pixels included in the optical black region,
the output values of the plurality of effective pixels are corrected based on the first offset amount, when the number of the specific effective pixels is one of equal to or larger than a first number,
the output values of the plurality of effective pixels are corrected based on the second offset amount, when the number of the specific effective pixels is smaller than a second number, and
the first number is greater than the second number.

* * * * *